US010540485B2

(12) United States Patent
Smaltz

(10) Patent No.: US 10,540,485 B2
(45) Date of Patent: *Jan. 21, 2020

(54) INSTRUCTIONS RECEIVED OVER A NETWORK BY A MOBILE DEVICE DETERMINES WHICH CODE STORED ON THE DEVICE IS TO BE ACTIVATED

(76) Inventor: David Gene Smaltz, Peabody, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/590,231

(22) Filed: Aug. 21, 2012

(65) Prior Publication Data

US 2013/0019162 A1   Jan. 17, 2013

Related U.S. Application Data

(63) Continuation-in-part of application No. 11/949,037, filed on Dec. 2, 2007, now Pat. No. 8,271,884.

(Continued)

(51) Int. Cl.
| | | |
|---|---|---|
| *G06F 12/12* | (2016.01) | |
| *G06F 21/12* | (2013.01) | |
| *A63F 13/71* | (2014.01) | |
| *G06Q 30/02* | (2012.01) | |
| *G06T 13/00* | (2011.01) | |
| *G06F 21/51* | (2013.01) | |
| *H04N 21/81* | (2011.01) | |
| *H04N 21/443* | (2011.01) | |
| *H04N 21/414* | (2011.01) | |
| *H04N 21/61* | (2011.01) | |
| *H04N 21/258* | (2011.01) | |
| *H04L 29/08* | (2006.01) | |

(Continued)

(52) U.S. Cl.
CPC .......... *G06F 21/125* (2013.01); *A63F 13/71* (2014.09); *G06F 21/51* (2013.01); *G06Q 30/02* (2013.01); *G06T 13/00* (2013.01); *H04L 67/34* (2013.01); *H04N 21/25841* (2013.01); *H04N 21/41407* (2013.01); *H04N 21/4438* (2013.01); *H04N 21/6125* (2013.01); *H04N 21/6543* (2013.01); *H04N 21/816* (2013.01); *H04N 21/8193* (2013.01); *H04W 4/50* (2018.02); *A63F 2300/552* (2013.01); *A63F 2300/5506* (2013.01); *G06F 9/44505* (2013.01); *G06F 9/44521* (2013.01)

(58) Field of Classification Search
CPC combination set(s) only.
See application file for complete search history.

(56) References Cited

U.S. PATENT DOCUMENTS 6,278,466 B1 * 8/2001 Chen .......................... 345/473
6,314,451 B1 * 11/2001 Landsman ............ G06Q 30/02
709/202

(Continued)

*Primary Examiner* — Hien L Duong

(57) ABSTRACT

Compiled code is stored on a mobile device or embedded in an application on the device. Instructions are assembled in a compiled program and stored on a system for subsequent transmission to the mobile device over a network. An application on the mobile device interfaces with the network to request and receive instructions. The instructions are retrieved from the data store and returned over the connection to the mobile device. After receipt by the mobile device, the instructions determine which code is to be activated. New instructions are downloaded to the device and the new instructions activate different code.

30 Claims, 28 Drawing Sheets

Related U.S. Application Data

(60) Provisional application No. 60/872,898, filed on Dec. 5, 2006.

(51) Int. Cl.
  *H04N 21/6543* (2011.01)
  *H04W 4/50* (2018.01)
  *G06F 9/445* (2018.01)

(56) References Cited

U.S. PATENT DOCUMENTS

| | | | | |
|---|---|---|---|---|
| 6,362,817 | B1* | 3/2002 | Powers | G06T 17/00 345/419 |
| 7,437,149 | B1* | 10/2008 | Papineau | G06F 9/485 455/418 |
| 7,783,729 | B1* | 8/2010 | Macaluso | G06F 8/63 709/220 |
| 7,907,966 | B1* | 3/2011 | Mammen | G06F 9/451 455/557 |
| 7,913,234 | B2* | 3/2011 | Neil | G06F 9/45508 717/136 |
| 8,694,925 | B1* | 4/2014 | Beust | G06F 17/2235 715/866 |
| 8,781,532 | B2* | 7/2014 | Gil | H04M 1/72561 455/566 |
| 2005/0033728 | A1* | 2/2005 | James | G06F 8/60 |
| 2005/0050474 | A1* | 3/2005 | Bells | G06F 8/38 715/747 |
| 2005/0079863 | A1* | 4/2005 | Macaluso | H04W 4/00 455/419 |
| 2005/0104886 | A1* | 5/2005 | Rao | 345/473 |
| 2005/0162431 | A1* | 7/2005 | Hirata et al. | 345/473 |
| 2005/0215238 | A1* | 9/2005 | Macaluso | G06Q 30/02 455/414.1 |
| 2006/0256130 | A1* | 11/2006 | Gonzalez | G06F 17/3089 345/619 |
| 2006/0294258 | A1* | 12/2006 | Powers-Boyle | G06Q 30/02 709/246 |
| 2007/0006136 | A1* | 1/2007 | Hirschberg | G06F 8/38 717/105 |
| 2007/0011334 | A1* | 1/2007 | Higgins | G06F 8/34 709/227 |
| 2007/0038728 | A1* | 2/2007 | Jacobs et al. | 709/219 |
| 2007/0066364 | A1* | 3/2007 | Gil | H04M 1/72561 455/566 |
| 2007/0067373 | A1* | 3/2007 | Higgins | G06F 11/3013 |
| 2007/0078810 | A1* | 4/2007 | Hackworth | G06F 16/957 |
| 2007/0106627 | A1* | 5/2007 | Srivastava et al. | 706/20 |
| 2007/0113181 | A1* | 5/2007 | Blattner et al. | 715/706 |
| 2007/0288424 | A1* | 12/2007 | Neil | G06F 17/30407 |
| 2007/0288853 | A1* | 12/2007 | Neil | G06F 9/4448 715/760 |
| 2008/0016176 | A1* | 1/2008 | Leitner | A63F 13/10 709/217 |
| 2008/0046557 | A1* | 2/2008 | Cheng | H04M 1/72525 709/224 |
| 2008/0148153 | A1* | 6/2008 | Lee et al. | 715/730 |
| 2008/0313282 | A1* | 12/2008 | Warila | G06F 8/24 709/206 |
| 2009/0132640 | A1* | 5/2009 | Verma | H04L 67/2861 709/203 |
| 2012/0036483 | A1* | 2/2012 | Soegtrop et al. | 715/839 |
| 2012/0190458 | A1* | 7/2012 | Gerson et al. | 463/42 |
| 2013/0286025 | A1* | 10/2013 | Spells et al. | 345/473 |

* cited by examiner

| Height | Frame 1 | Frame 2 | Frame 3 | Frame 4 | Frame 5 | Frame 6 | Frame 7 | Frame N |
|---|---|---|---|---|---|---|---|---|
| Width | | | Replay | | | | | |

FIG. 24A

| Tilt Up 0 Side 0 | Tilt Up 0 Side 1 | Tilt Up 0 Side 2 | Tilt Up 0 Side 3 | Tilt Up 0 Center 4 | Tilt Up 0 Side 5 | Tilt Up 0 Side 6 | Tilt Up 0 Side 7 | Tilt Up 0 Side 8 |
|---|---|---|---|---|---|---|---|---|
| Tilt Up 1 Side 0 | Tilt Up 1 Side 1 | Tilt Up 1 Side 2 | Tilt Up 1 Side 3 | Tilt Up 1 Center 4 | Tilt Up 1 Side 5 | Tilt Up 1 Side 6 | Tilt Up 1 Side 7 | Tilt Up 1 Side 8 |
| Tilt Up 2 Side 0 | Tilt Up 2 Side 1 | Tilt Up 2 Side 2 | Tilt Up 2 Side 3 | Tilt Up 2 Center 4 | Tilt Up 2 Side 5 | Tilt Up 2 Side 6 | Tilt Up 2 Side 7 | Tilt Up 2 Side 8 |
| Tilt Up 3 Side 0 | Tilt Up 3 Side 1 | Tilt Up 3 Side 2 | Tilt Up 3 Side 3 | Tilt Up 3 Center 4 | Tilt Up 3 Side 5 | Tilt Up 3 Side 6 | Tilt Up 3 Side 7 | Tilt Up 3 Side 8 |
| Center 4 Side 0 | Center 4 Side 1 | Center 4 Side 2 | Center 4 Side 3 | Center 4 Center 4 | Center 4 Side 5 | Center 4 Side 6 | Center 4 Side 7 | Center 4 Side 8 |
| Tilt Dn 5 Side 0 | Tilt Dn 5 Side 1 | Tilt Dn 5 Side 2 | Tilt Dn 5 Side 3 | Tilt Dn 5 Center 4 | Tilt Dn 5 Side 5 | Tilt Dn 5 Side 6 | Tilt Dn 5 Side 7 | Tilt Dn 5 Side 8 |
| Tilt Dn 6 Side 0 | Tilt Dn 6 Side 1 | Tilt Dn 6 Side 2 | Tilt Dn 6 Side 3 | Tilt Dn 6 Center 4 | Tilt Dn 6 Side 5 | Tilt Dn 6 Side 6 | Tilt Dn 6 Side 7 | Tilt Dn 6 Side 8 |
| Tilt Dn 7 Side 0 | Tilt Dn 7 Side 1 | Tilt Dn 7 Side 2 | Tilt Dn 7 Side 3 | Tilt Dn 7 Center 4 | Tilt Dn 7 Side 5 | Tilt Dn 7 Side 6 | Tilt Dn 7 Side 7 | Tilt Dn 7 Side 8 |
| Tilt Dn 8 Side 0 | Tilt Dn 8 Side 1 | Tilt Dn 8 Side 2 | Tilt Dn 8 Side 3 | Tilt Dn 8 Center 4 | Tilt Dn 8 Side 5 | Tilt Dn 8 Side 6 | Tilt Dn 8 Side 7 | Tilt Dn 8 Side 8 |

FIG. 24B

INSTRUCTIONS RECEIVED OVER A NETWORK BY A MOBILE DEVICE DETERMINES WHICH CODE STORED ON THE DEVICE IS TO BE ACTIVATED

CROSS-REFERENCE TO RELATED APPLICATIONS

This application is a continuation-in-part of U.S. application Ser. No. 11/949,037, filed on Dec. 2, 2007, now U.S. Pat. No. 8,271,884 which claims the benefit of provisional U.S. Application No. 60/872,898, filed on Dec. 5, 2006, the disclosures of which are incorporated herein in their entirety.

FIELD OF THE DISCLOSURE

This disclosure relates to the efficient and secure delivery of not compiled code instructions over a network to previously downloaded and running compiled coded in the operating system, application or browser plugin on a device to exhibit and change appearance, functionality and behavior, with application to animation, video and 3D players.

BACKGROUND OF THE DISCLOSURE

An increasing number of mobile devices are being offered on the market with various operating systems (OS), typically featuring a software developer kit for programming, compiling, and downloading applications to run on the device. Examples of major Software Developer Kits (SDK) presently available include:
   ORACLE Java technology, which is implemented for devices as J2ME SDK.
   RIM OS SDK for Blackberry devices.
   QUALCOMM has developed the Binary Runtime Environment for Wireless (BREW) platform.
   MICROSOFT has implemented Windows Mobile and SDK for devices
   GOOGLE offers the Android OS and SDK used on many devices.
   APPLE offers an Objective C SDK for developing applications for the iPhone and iPad.

All of these SDK have been used by developers to program and compile applications which are downloaded over the air by the user and stored locally on a mobile networked device for subsequent execution by the user. But once downloaded, the application compiled code is limited by the sandbox security model as to the content it can download to the device.

On desktop computer machines, applications can load new classes from external sources while the application is running to alter functionality or content presented to the user. This capability has been misused by developers and has resulted in a vast number of unwanted destructive viruses and adware being installed on desktop computers. Care was taken in writing standards for mobile networked devices to provide more security with what is called the "sandbox" model to prevent this from occurring on these devices. Mobile network application security is important to everyone involved in the industry; the security on mobile networked devices is not likely to be loosened by carriers and software standards for at least the following reasons:
   Mobile network carriers want to be sure that viruses do not bring down their customers' devices or their networks.
   Device manufacturers don't want customer installed software crashing their devices.
   Users want to download and run code without the fear that the code will take over their device or plant a virus or spywear on their device. Additionally, users want control over expensive network usage.
   Application developers want to know that their applications will not be compromised by other applications to perform malicious acts.
   No one wants to have to install security software on their mobile networked device to prevent viruses and spyware.

The sandbox security model was developed to prevent downloading disruptive or destructive software (compiled code) to mobile devices. The sandbox security model on mobile networked devices limits applications to only the compiled code that was originally downloaded and installed by the user, and prevents the downloading of additional compiled code from an external source.

While this security model prevents the devious attacks mentioned above, it also prevents the download of additional code to make new functionality available to applications running on the devices. On most mobile platforms, applications are only allowed to download image, byte data, text files and video. Due to the sandbox, games, content and advertising are thus tethered to the code initially downloaded by the user. A game or ad can change the images presented by downloading new image files, but it can't change the behavior of the game or ad while running. To play a different game, display another ad, or animation exhibiting different behavior requires the download and installation of new compiled code on the mobile networked device, thus limiting the extent to which authors of such content can alter the behavior while running on the mobile networked device.

However, some vendors have left security holes open for exploitation. For example, the Android OS allows the download of compiled coded by installed applications, but this is not considered a good practice and it is not a trusted, portable, well performing method. The powerful permissions required, which must be granted by the user, open access by other applications on the device to download and execute malicious code in the name of the application signer. Indeed, present Android devices face threats from downloaded applications and Android is tightening security. Other vendors, such as Apple, closely monitor applications for such security risks before allowing the application to be downloaded, thus ensuring compliance with the sandbox security model. Moreover, the file size of the compiled code is often so large that it introduces performance issues which make it ill-suited for to exhibiting and changing appearance, behavior and functionality on devices.

The downloading of compiled code by an application on a mobile device is presently considered bad practice and largely prohibited. The security restrictions in place on mobile devices which have kept them relatively clear of malicious malware will remain in place; one skilled in the art would understand the risks and not download compiled code in mobile applications.

Accordingly, there presently is a need for an efficient method to deliver and display a plurality of graphical presentations and or advertising and games to mobile networked devices without having to reprogram said mobile networked devices to display each distinct said graphical presentation.

Furthermore, there is a need for an efficient and secure method of downloading not compiled code instructions, within the security sandbox, to trigger capabilities compiled into the previously downloaded code to exhibit and change appearance, behavior and functionality on devices and apply it to a more efficient video player for use with animations and a 3D player on all devices.

Brief Description of Terms

Sprite—A term that has become accepted in computer gaming to refer to a protagonist in a game. Sprites are represented with images and movement which change according to code in the compiled application which include, but are not limited to: Random, Vertical, Lateral, Lateral and Vertical Projectile, Rotating Text and Image, Video and Rotating Banner.

Graphical animation capabilities—A set of code which executes an aspect of graphical display and or movement logic on the mobile networked device such as image display, vertical, lateral, both vertical and lateral, video and 3D, or random movement of a graphical image, or removal of image upon collision with another image.

Presentation—A term used in the field of the invention to refer to the graphical rendering and movements produced on the screen of the mobile networked device which is produced by instructions triggering the graphical animation capabilities.

Collection of Presentations—A term used in the field of the invention to refer to instructions ordered to constitute a collection of instructions as a series of Presentations delivered to the mobile networked device.

Perpetrator—A term used to define a Sprite which causes other Sprites to be removed from the Presentation upon collision with it.

Server—A machine on a network which can run compiled code of the invention which accepts connections and can send content and instructions to a mobile networked device or application on a mobile networked device.

Instructions—The delimited integers, characters and bitmasks that trigger the graphical animation capabilities. For a Random Sprite the instructions may include, but not be limited to, the URL address for the image to display, frequency, location and dimensions used to create the Random Sprite, the maximum number of Random Sprites to create and a protagonist that may remove the Random Sprite upon collision.

Mobile networked device—A mobile networked device includes a processor, and possibly display screen, and storage. The device is either physically connected to a network or connected to a network over the air using some type of mobile network technology, such as, but not limited to wireless cellular communication. Such mobility may be accomplished by a person carrying the device or the device being installed in some other component or larger mobile networked device.

Entity—An organization or business with members or customers who would view advertising.

SUMMARY OF THE DISCLOSURE

The inventor recognized that the security restrictions enforced on mobile networked devices would severely hinder the variety of graphical Presentations, games, advertising and other graphical content that could be efficiently and securely presented on mobile networked devices. The extent of change an application could affect would be limited to just changing the images and text on the screen or loading new videos or sounds to play. Anything to do with changing the movement and behavior of the download content would involve the download of a new compiled application. The previously discussed programming SDK as delivered by the respective vendors do not provide any code or methods which could be used, as is, to affect a change in animated movement or game logic from what was originally compiled as an application by the developer using the language and then subsequently downloaded by the mobile networked device. Some offer flexibility to download new text, images and or video files, but no functionality exits to enable a complete change in animation, game logic or overall appearance of the Presentation as compiled and installed on the mobile networked device. Thus, mobile application advertising is limited to banner ads without animation.

The inventor further recognized that all graphical animation capabilities on mobile networked devices could be abstracted, compiled and then downloaded and loaded on to the mobile networked device, providing the capability to present all possible movements and behaviors that could take place on the screen. Once loaded, the graphical animation capabilities could be triggered by instructions from a web server to the application code running on the device to present a particular screen action, such as lateral and or vertical movement, random creation of Sprites, projectiles, collisions and other graphic content that are used in games and or ads.

The abstraction of the basic graphical capabilities available in programming languages into graphical animation capabilities provides the ability to present various advertising, games and animation on the screen without downloading new compiled code to the mobile networked device. Desired behavioral characteristics could be triggered in an application running on the mobile networked device by not compiled instructions from a web application server; thus performing within the sandbox designed and enforced by network providers and making more efficient use of limited mobile network bandwidth.

Animations presented by the invention on mobile networked device screens may be part of an application or independent of a particular application. The invention code would be self contained and could be a standalone application or embedded in another application, a browser plug-in or the operating system of the mobile networked device. The invention would operate as a service for the Presentation of games and advertising or a game that imparts advertising material on a mobile networked device. This service, disclosed in the parent application, is referred to as Graphical Animation Advertising and Informational Content Service for Handheld Devices or GADS.

In summary, a method embodying the present disclosure overcomes the limitations of existing technology by providing a more efficient method for the delivery of a plurality of graphical Presentations and or advertising and games on networked devices. While existing technology requires the download of compiled code, HTML or scripting languages to affect logic and behavioral changes to Presentations and games, the present disclosure requires only new not compiled code instructions to accomplish the same changes. When used as a service by entities, hours of programming time is saved producing ads for users who are also spared the inconvenience of massive downloads over limited bandwidth for advertising and games.

Implementations may include one or more of the following features. For example, instructions for one or more Presentations and informational content as a collection of Presentations may be downloaded to the mobile networked device over a mobile network interface. The instructions are then used to download graphical or text elements to the device and present the graphical or text elements on the mobile networked device with movement and animation that may impart an advertising message, a game or other informational content.

According to an embodiment of the disclosure, a set of code defines all aspects of graphical movement in graphical animation capabilities and logic on the mobile networked device, which may include vertical, lateral, both vertical and lateral, random, or removal of images upon collision of images. The combination and instantiation of instructions is ordered to trigger capability in compiled binary code said loaded and running on said device to exhibit and change appearance, functionality and behavior.

Once all instructions for all Presentations in the collection have been loaded in an array in the invention a background process is started on the mobile networked device in accordance with the invention. The code then runs in the background and loops through the objects, creating each Presentation by executing the code for the graphical animation capabilities. The application then presents the graphics on the device screen and then loops through the instantiated types and moves them according to the instructions provided. In this embodiment, the instructions are used to provide a graphical Presentation on the screen of the mobile networked device.

The instructions generally include a time limit. After the Presentation is displayed on the device and the time limit has expired, the instructions for the next Presentation are used to create a new graphical Presentation. Graphical or text elements may be downloaded prior to the expiration of the previous Presentation for inclusion in the next Presentation. With the instructions and graphical or text elements previously downloaded to the mobile networked device from the web application server, a new Presentation is presented on the mobile networked device that is completely different from the previous Presentation.

According to an embodiment of the disclosure, a mobile networked device may be programmed to operate in accordance with a set of code, based upon a programming language, to implement graphical animation capabilities to be triggered by instructions to present graphical animation and informational content on a mobile networked device.

According to another embodiment of the disclosure, a web application server may be programmed to send code to a browser to enable assembly of not compiled code instructions and to send assembled instructions to a server to store the instructions.

According to another embodiment of the disclosure, storage is provided in a server for the not compiled code instructions returned to the web application server from the browser code. The instructions are stored in the server in an order of collections of Presentations.

According to another embodiment of the disclosure, a mobile networked device may be programmed to initiate a network communication to a remote web application server to download the Presentation instructions and URL locations of graphical or text elements to be used to create a collection of Presentations on the mobile networked device, which may be based on geographical locations determined by GPS on said device.

According to another embodiment of the disclosure, another network communication is initiated to a remote web application server, after a specified period of time, to download more instructions and URL locations of graphical or text elements to create a new collection of Presentations on the mobile networked device.

BRIEF DESCRIPTION OF THE DRAWINGS

The foregoing aspects and other features of the present invention are explained in the following description, taken in connection with the accompanying drawings, wherein:

FIGS. 24A and 24B show examples of a video player image sheet and a 3D image sheet, respectively.

DETAILED DESCRIPTION

Figure 1:
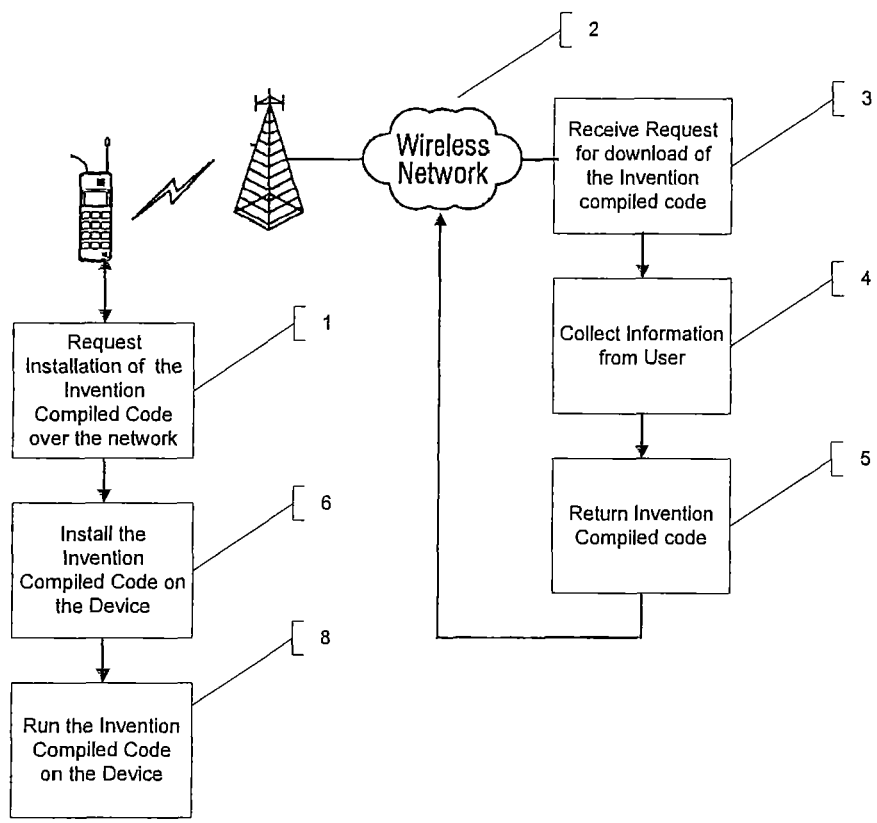
FIG. 1 is a flow diagram of the method used to download the application in accordance with the invention to the mobile networked device.

Techniques will be described for sending instructions and graphical or text elements to an embodiment of the disclosure running as an application, OS or browser plug-in on a mobile networked device, to trigger graphical animation capabilities to display or otherwise present collections of graphical Presentations to a user of a mobile networked device, which may also include an audio or video component.

Mobile Browsers and Mobile Applications

It will be appreciated that mobile browsers are distinct from mobile applications: An Internet Browser, hereinafter referred to as browser, is an application that; once installed and running on the mobile device, downloads HTML code which requires an interpreter to compile the code into machine language to display and change content on the screen.

However, if a change in the browser application itself is required, a new version must be programmed, compiled and downloaded to the device.

In contrast, the not compiled code instructions described herein do not require a compiler or browser interpreter, but rather trigger previously downloaded compiled code on the mobile device to exhibit and change appearance, functionality and behavior of the application on the mobile device.

Video/Audio Player

In a GADS service embodying the present disclosure, Video/Audio player capability is presented as a Video Sprite which plays a video in a frame within the ad window along with the animation. Accordingly, the GADS service supports the playing of video as part of the presentation without movement or with movement of the video frame along the x and y axis, so that the Video Sprite appears as a participant in the overall animation.

Embodiments as disclosed in the parent application may include video sprites as a participant in the animations. The inventor found, however, that the video players offered in the various platform SDKs are not efficient enough to be included as part of animations: the players often experience annoying delays, are slow to restart at a previous position; may require user interaction with buttons; and moreover do not integrate well with animations presented by the parent application invention. In sum, these platform video players are better suited for large videos that fill the entire screen and users tolerate the delays, not as a quick loading component for animations. Thus the inventor was motivated to extend the efficient and secure method of the invention to exhibit and change video with video frame movement within the overall animation.

To accomplish this, capability to display frame images from a larger image packed file with a set image frame width and height at a frequency that results in the appearance of a video on the device screen is compiled into code and then loaded on a device including a processor, screen and ability to connect to a network. Then the desired sequence of frame images are extracted from a larger video file and packed into an image file. An accompanying audio file may be included that is sequenced by image frames for playback with the video. The capability compiled code is then loaded on to the device and run.

Then not compiled code instructions are assembled, which specify the width and height of each individual image frame packed in the larger image file, along with the frequency to display the frames. Whereby, when these instructions are passed to the compiled code on the device along with the packed image file, the compiled code capability is triggered by the instructions to calculate the total image size and the number of frames which is used along with the frequency to show the images in sequence like a video and possibly play the accompanying audio for the frame. An example of a video frame image sheet is shown in FIG. 24A.

The video player may be configured to respond to direction from the user interface to reposition the image frame to display either forward or backward within the larger image. This enables the user to reposition the video position for playback or stop the video play at a certain image frame.

By including in the instructions a replay frame number to restart the video when the capability code reaches the end of the image frames, the video will keep playing from that specified replay position to the end or even in reverse order if specified. In the video image sheet example above, the replay position is frame 3. With the subject of the last frame and replay frame in the same position, this results in a smooth replay motion. Furthermore with the video playing, the video frame containing the video can participate in the overall animation of the presentation by specifying in the instructions the starting x and y axis for the parent frame and movement parameters to sequence with the animation.

The use of the not compiled code instructions method to trigger the capability in the compiled code running on the device to exhibit and change the video using variable frame image size, frequency, restart position and movement specified is unique. In the absence of not compiled code instructions of the invention specifying this variable information, each packed image file downloaded to the compiled code on the device would have to have the same individual frame size, start at the same position and replay at the same position, and the same position and movement in the animation.

A GADS service embodying the present disclosure is generally able to play videos using either a platform player or a player as described herein. As noted above, video presentations will generally include movement of the video frame along the x and y axis within the presentation to appear as part of the animation. Presently available platform players provide such video at a relatively much slower rate.

It is understood that video programs may generally include audio. In particular, audio may accompany an animated presentation.

Example: Video Player

In a specific embodiment, content is prepared for the video player by disassembling a real video format file into frames. In practice the video typically has a transparent background, accomplished by shooting it with a green screen background. Then the frames that fit with the ad theme are selected, scaled for the presentation, and packed into a sprite sheet. The accompanying instructions of the invention trigger the downloading of the file and activation of the player, positioning the frame at desired the x and y axis point. Once downloaded, the frames are run through the player at a frame speed independent of the animation to show the video. There is no theoretical limit on the number of frames that can be packed into a sprite sheet, but for downloading using current networks, 30 frames (less than 300 k in total file size) may be considered a practical limit. Once the player reaches the end of the sprite sheet, it may start again at a frame designated by the ad creator: the first frame, a frame that is synchronized with the movement of the last frame, which could be the first or middle frame; or it may play the video in reverse. With each frame movement, the x and y axis of the video frame can be adjusted to make the frame move within the overall animation. An audio portion could be added to match each frame and be played and adjusted along with the frames.

3D Player

In another embodiment, the not compiled code instructions of the invention can also be used to trigger capability programmed, compiled, loaded and run on a mobile device, including processor, screen and ability to connect to a network, to display image frame 3D views packed into an image sheet organized in rows and columns with set frame image width and height (see FIG. 24B). The capability code can display 3D image view frames in sequence or in response to direction from the user interface.

As with the video player, the not compiled code instructions includes the frame size of each 3D view packed into the image sheet as in the example table above. The instructions trigger capability in the compiled code on the device to display the images in sequence or using direction from the user interface: Tilt Up=minus a row, Tilt Dn=plus a row; Left=minus one column; and Right=plus a column. For example, when at the center row and column Center 4 Center 4 and direction from the user interface indicates Tilt Up and to the Left, it displays the 3D image view frame Tilt Up 3 Side 3. Moreover, the frame size and total image size in the instructions are used by the capability in the compiled code to compute boundaries that prevent a call for the display of a nonexistent frame outside of the total number of rows and columns or beyond zero and either stop the Tilt Up, Tilt Dn or Left, Right movement; or roll over to the opposite view (i.e. Tilt Dn. 8 Side 8 becomes Tilt Up 0 Side 0).

Note that in packing the image file sheet, the mirror effect needs to be take into account and the Side 0 is actually the right most visual and Side 8 is the left most visual side. The example above does not include back side views, but that is certainly possible with a much larger packed image file.

The instructions of the invention trigger the previously downloaded capability in the compiled code to exhibit and change 3D presentations. Using the specified width and height size of each individual 3D view and the initial frame to display in the not compiled code instructions, the capability compiled code on the device is triggered to calculate the number of rows and columns. This enables the compiled code previously downloaded to the mobile device to display any configuration of 3D image sheets and with a different start view.

In the absence of the not compiled code instructions of the invention to trigger the capability in the compiled code previously downloaded to the mobile device, each 3D sheet would have to have the same 3D view frame size and the same start view. But, using the instructions of the invention, which are downloaded to the compiled code running on the device along with the image sheet, the capability in the compiled code on the device is triggered to exhibit and changes the appearance, functionality and behavior of the 3D views on the device.

Bandwidth Governor

The device may also be configured with a bandwidth governor that downloads ads that fit the available bandwidth at the user location. For example, advertisers may have 3 versions of an ad: Below 3G low bars, 3G high bars and 4G and above or Wi-Fi.

User Interaction

Various forms of user interaction are available on devices such as touch, keyboard voice and other user interaction will certainly be available in the future. In this continuation in part, the drawings and claims have been updated to incorporate user interaction capability which could include, but not limited to keyboard, touch screen, voice and other future interaction.

The not compiled code instructions for each presentation specify the user interaction capability to be triggered in the compiled code by a listener that waits on interface events. For example, the instructions may specify that one presentation does not allow for the expansion of the frame, while the next one does.

A user interface in an embodiment of the disclosure may include one or more of the following features:

Start and stop the animation presentation (For touch it is tap).

Start and stop audio for animation, video or 3D player if available (For touch it is double tap).

If specified in the instructions, open a browser window independent of the application and load the vendor or other URL specified in the not compiled code instructions (For touch it is long press).

If specified in the instructions, expand the frame to a size detailed in the not compiled code instructions. The expanded screen will then load either larger images to be animated; a video with the SDK player or invention video; or invention 3D player (For touch it is drag).

The 3D player shows the image on the screen that corresponds to the interface direction (for touch it is drag left; right; up; and down). The video player also responds to the interface to move the frames forward or back (for touch it is drag left and right).

Taken in concert with features previously disclosed in the parent application, the Video and 3D player become a different type of animation to display, thus having one animation with video and 3D player and others without.

Application to Robotics

In alternative embodiments, instructions as described above may direct robots in different tasks. Present-day robots are largely single purpose, with each one being programmed and physically designed to perform a specific task or function. These robots perform different tasks either by being reprogrammed entirely, or by passing parameters to a control program for the robot.

For robots constructed for multiple purposes and carrying out different roles, all the logic for each role could be programmed and loaded in the robot as described herein with regard to appearance, functionality and behavior, comprising: animation, color, physical configuration, logic, interface, user interface, and artificial intelligence. The invention could then be used to deliver instructions that triggers the logic previously downloaded to the robot for the appearance, functionality and behavior of the role it should perform.

Detailed Description: Drawings

Specific processes embodying the disclosure are schematically illustrated in the drawings, as detailed below.

FIG. 1 is a flow diagram of how the invention is downloaded by the user and installed on a mobile networked device. The invention compiled code is requested by the user from the handheld device (step 1) over the network (step 2). When the web server receives the request from the mobile networked device (step 3) it may request information from the mobile networked device user including, but not limited to name and demographics, occupation and interests (step 4). The invention compiled code is sent to the mobile networked device (step 5) OTA (step 2). The user then selects to install the invention compiled code on the mobile networked device (step 6). The user then runs the invention compiled code on the mobile networked device (step 8).

Figure 2:
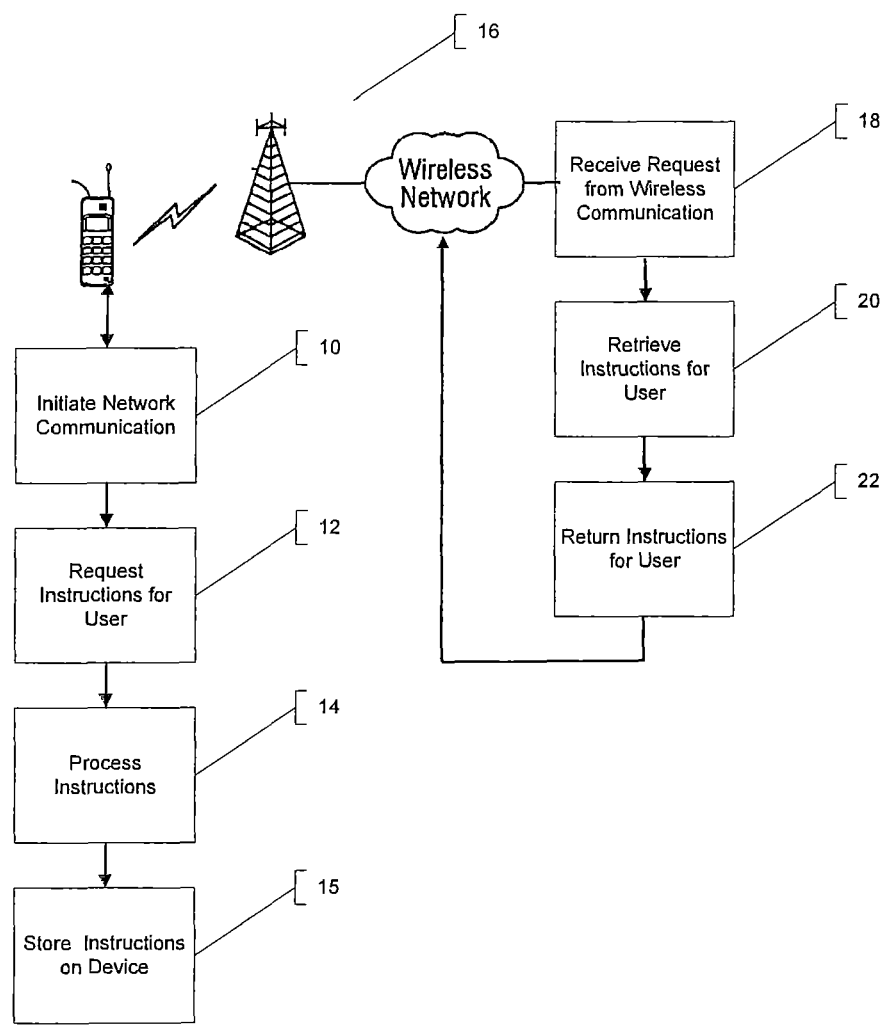
FIG. 2 is a flow diagram of the method used on the mobile networked device to communicate with a web application server in accordance with the invention to retrieve Presentation instructions.

FIG. 2 is a flow diagram of the invention downloading instructions on a mobile networked device. The invention may be stored on the mobile networked device at the time of manufacture or may be subsequently loaded onto the device, including through the use of an over the air (OTA) downloading procedure. The invention on the mobile networked device requests communication with a Web Application server (step 10) over the air (step 16) and requests instructions from the application server (step 12), passing user credentials and possibly location information, utilizing Global Positioning Technology on the mobile networked device. The web application server receives the request for instructions (step 18) over the connection (step 16). Instructions are retrieved from a data store (step 20) and returned over the connection to the invention on the mobile networked device (steps 22 and 16). The mobile networked device processes the instructions and stores the information on the mobile networked device (step 15).

Figure 3:
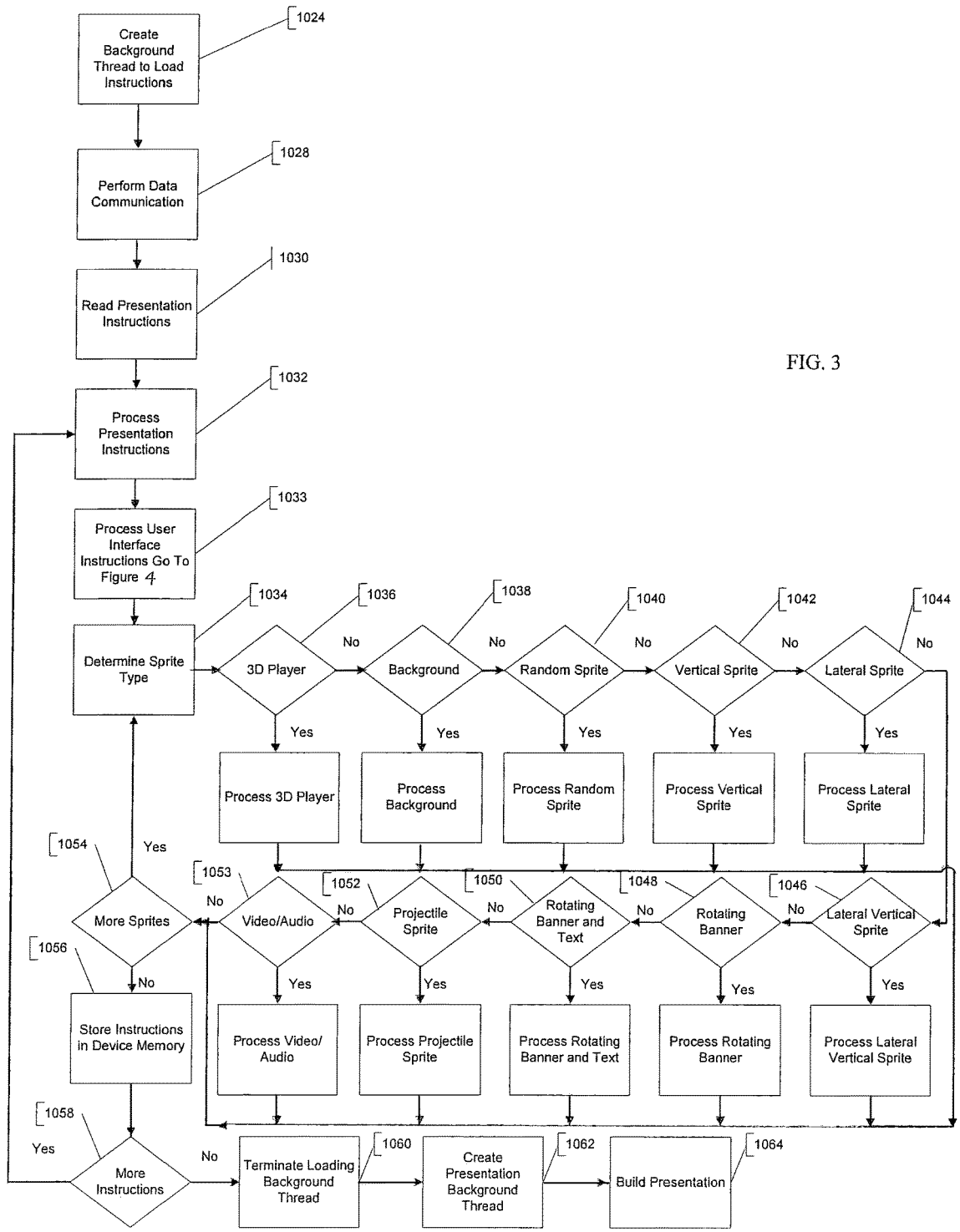
FIG. 3 is a flow diagram of the method used by the invention to load instructions sent by the web application server to the device and adding user interaction, video/audio and 3D Player.

FIG. 3 is a flow diagram of how instructions are processed by the invention and stored on the mobile networked device. The invention begins by instantiating code to store the instructions for Presentations and creates a background thread to read and store the instructions (step 1024). The invention then requests the instructions from a web application server (step 1028) as described in (FIG. 2). The instructions are then read and processed (step 1030 and 1032) and the user interaction instructions are processed in (step 1033: Go to FIG. 4). Then instructions are processed according to the type component or Sprite contained in the instructions by calling methods to add the various types to an array to be later enumerated and presented (steps 1034 through 1054). The invention then stores the instructions in memory (step 1056) and checks to see if more instructions exist (step 1058).

The invention repeats steps 1034 through 1058 until all the instructions sent by the web application server have been read and processed. The invention then terminates the background thread for loading instructions and creates a new background thread for running the Presentation collection and then follows the instructions sent by the web application server to begin the first Presentation (steps 1060 through 1064).

Figure 4:
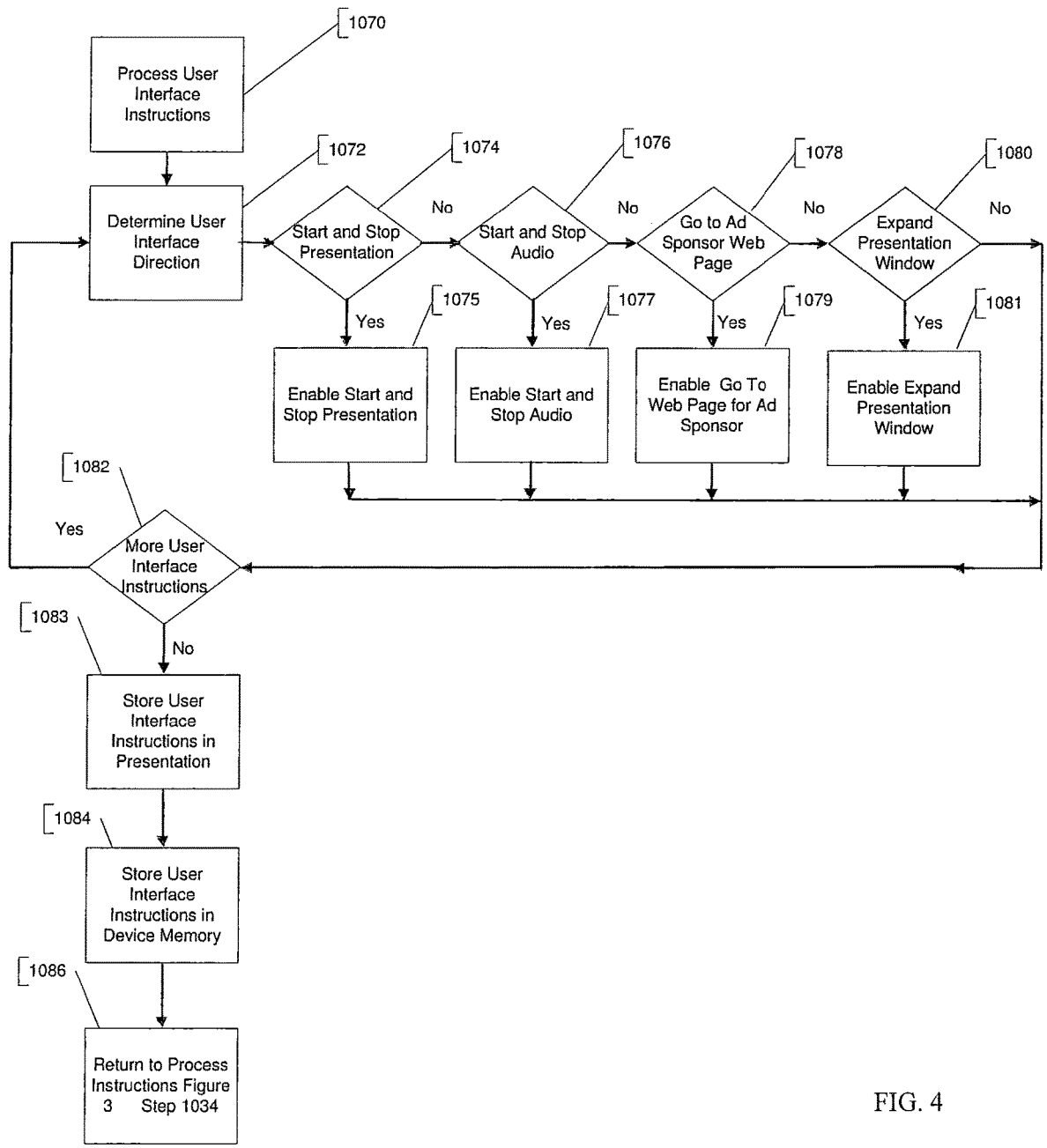
FIG. 4 is a flow diagram of the method used by the invention to load instructions for user interaction with the invention.

FIG. 4 is a flow diagram of how user interaction instructions are processed by the invention. The user interaction is determined from instructions (steps 1070 through 1072) and based upon the interface used in the invention (touch screen, voice or other) the action is determined (such as tap single tap touch or the words "start" to start and stop the presentation) and the action is mapped with the interface actions (steps 1074 through 1081). Step 1082 is a check to see if there are more user interface instructions and if so, steps 1072 through 1081 are repeated. If there are no more user interface instructions, then the user interface instructions are stored in the Presentation and in memory (steps 1083 through 1084) and processing is returned to FIG. 3 step 1034 (step 1086).

Figure 5:
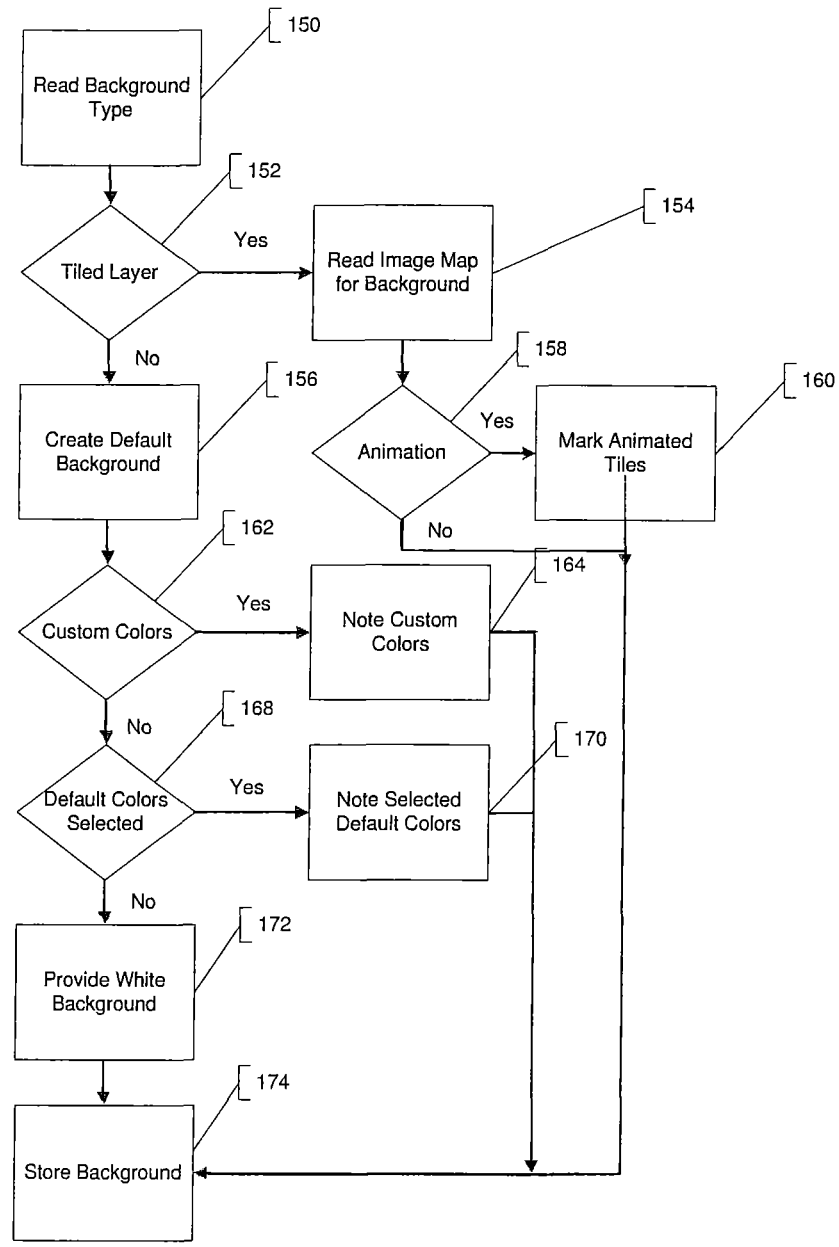
FIG. 5 is a flow diagram of the process for loading a Background for the Presentation into the invention.

FIG. 5 is a flow diagram that describes how a graphic Background can be specified for the Presentation. The invention allows for a Tiled Layer to be provided for Presentations (step 150). A Tiled Layer is a visual element composed of a grid of cells that can be filled with a set of tile images. If a Tiled Layer has been defined, the URL of the image to be used for the Tiled Layer is read from the instructions (steps 152 and 154). Animation can also be defined for the Tiled Layer Background (steps 158 and 160). Animated tiles enable the invention to change the appearance of the Presentation Background. The instructions sent to the invention can include details on how to move the tiles around to create an animated effect. If a Tiled Layer is not specified in the instructions, a custom color for the Background can be specified (steps 162 and 164). The invention includes a set of default Background colors found on most mobile networked devices which can be specified in the instructions for the Presentation (steps 168 and 170). If the instructions do not specify a Background, a white Background color is provided by the invention (step 172). The invention then stores the Background information in the Presentation (step 174).

Figure 6:
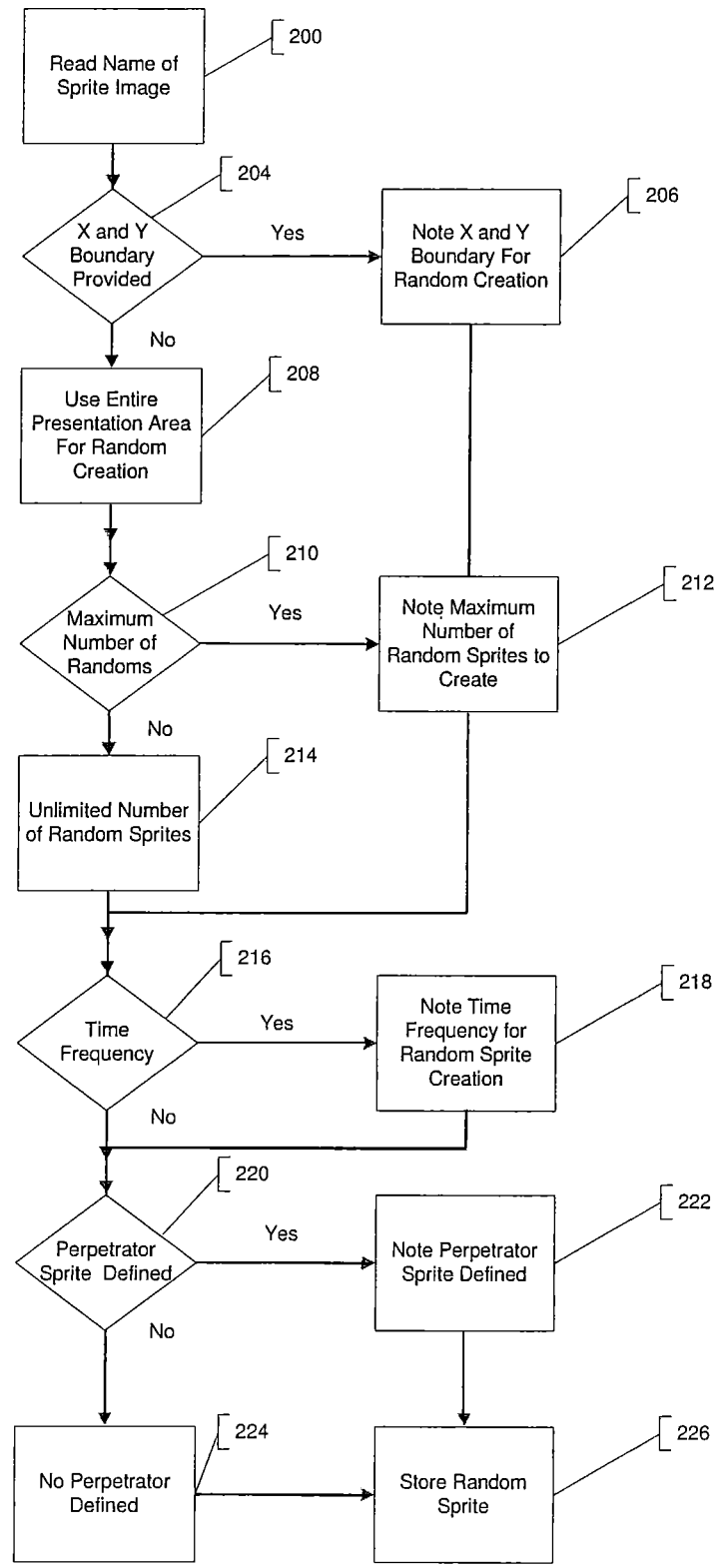
FIG. 6 is a flow diagram of the process for loading instructions for a Random Sprite into the invention.

FIG. 6 is a flow diagram that describes how a Random Sprite can be added to a Presentation. A Random Sprite is an image that is created at specified intervals and placed in random positions within the defined Presentation area. The instructions from the web application server must contain a URL for the image to be used for the Random Sprite (step 200). A specific area in the Presentation can be specified or the entire Presentation area is used as a boundary for creation of Random Sprites (steps 204 through 208). The maximum number of Random Sprites to be created can also be specified in the instructions (step 210 and 212). If a maximum number is not specified, Random Sprites are created until the Presentation ends (step 214). A frequency must also be provided in the instructions to determine how often the Random Sprites are to be created and placed in the Presentation (steps 216 and 218). A perpetrator can be defined in the instructions for a Random Sprite (step 220 and 222). The instructions for the Random Sprite is then stored in memory (step 226).

Figure 7A:
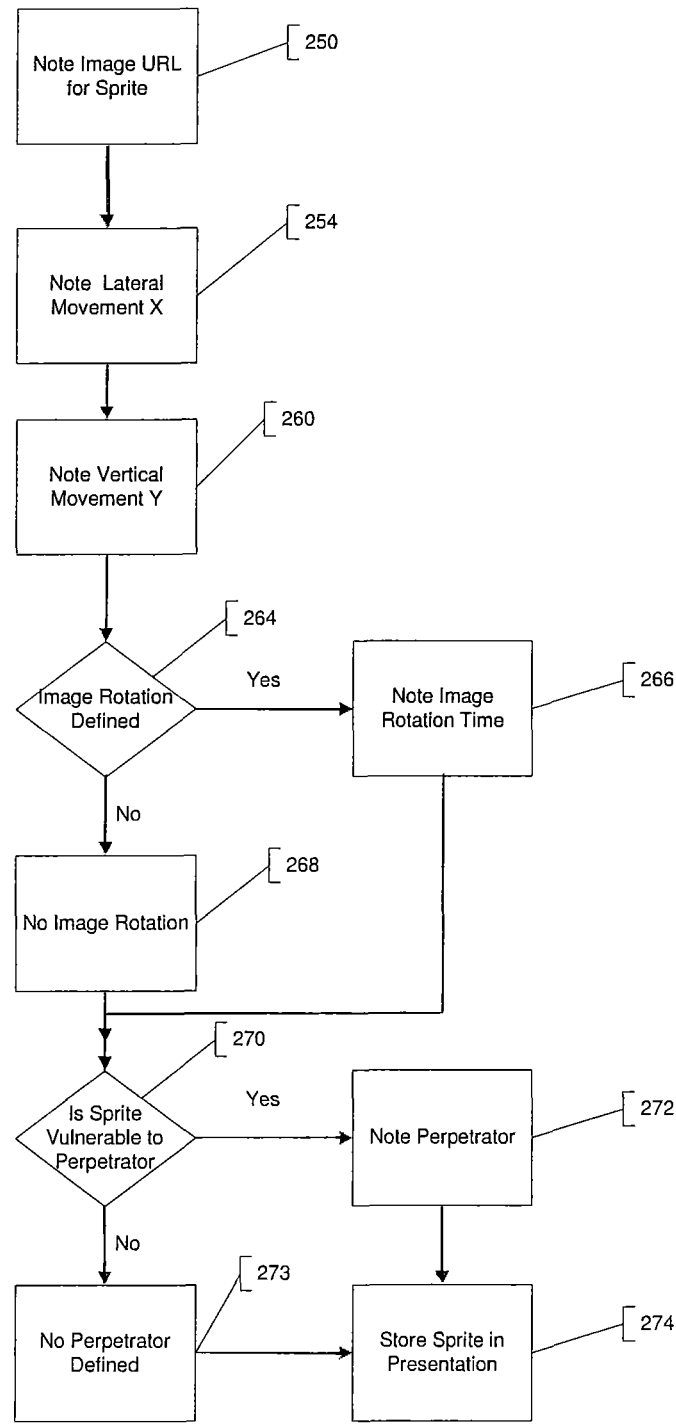
FIG. 7A is a flow diagram of the process for loading instructions for a Lateral Vertical Moving Sprite into the invention.

FIG. 7A is a flow diagram that describes how a Lateral and Vertical Moving Sprite is created for a Presentation by the invention from the instructions sent by the web application server. Vertical and Lateral Sprites consist of an image that moves either vertical, which may appear like jumping, or lateral which may appear like walking. Some Sprites may be enabled to move both laterally and vertically which could appear like a bouncing ball. The image URL must be specified in the instructions (step 250). The instructions specifying lateral and or vertical movements for the Sprite are read by the invention (steps 254 through 260). If the image for the Sprite is to be changed with movement, the timing is specified in the instructions (steps 264 and 266) If a perpetrator is defined for this Sprite in the instructions, this is noted by the invention (steps 270 and 272). The instructions for the Sprite is then stored in the Presentation (step 274).

Figure 7B:
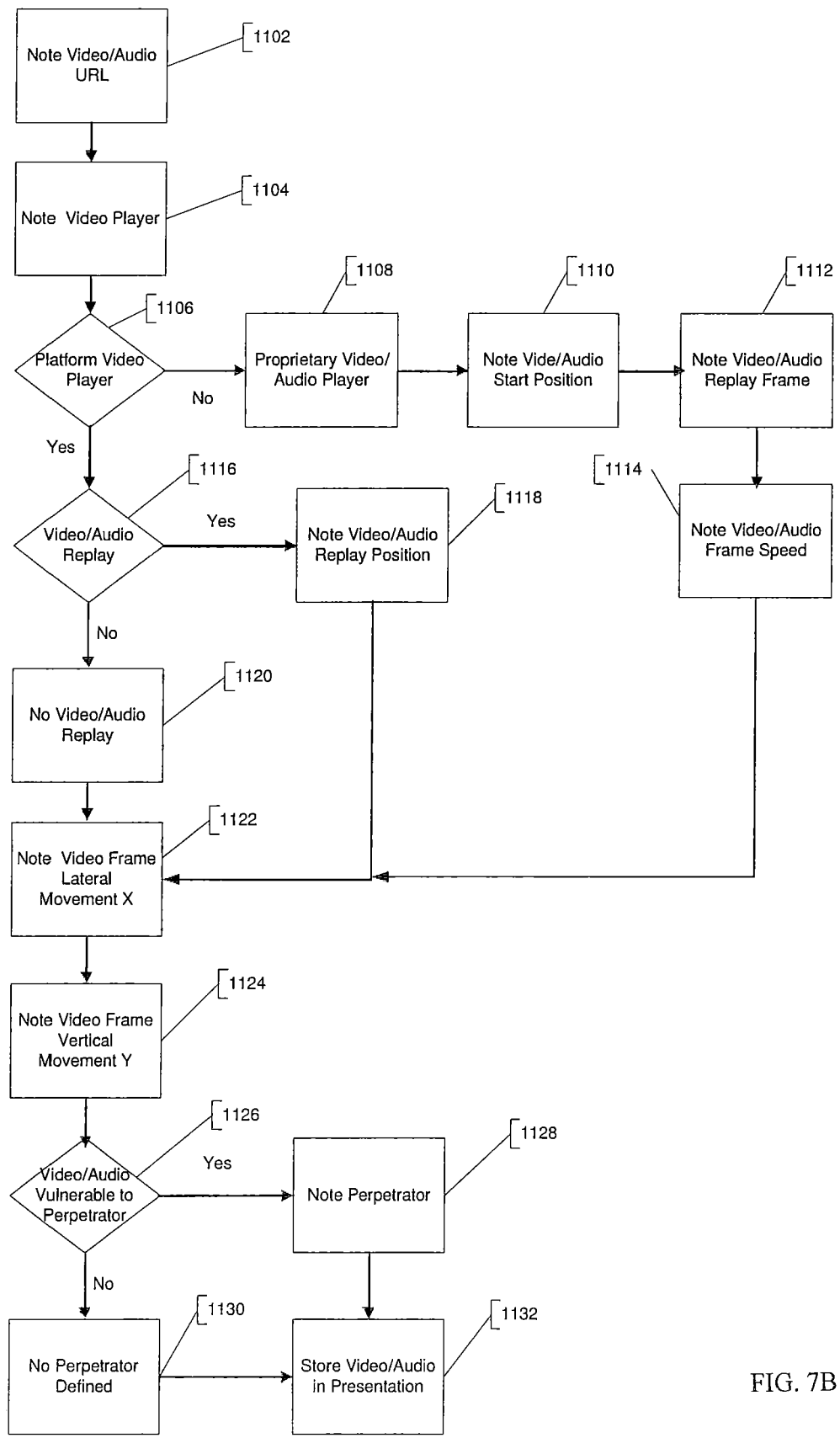
FIG. 7B is a flow diagram of the method used by the invention to load instructions for video/audio using either the platform video player or the video player of the invention.

FIG. 7B is a flow diagram to show how a video is played and moved as part of a presentation. Note the URL where the video file is stored (step 1102) and which video player should be used: platform or proprietary (step 1104). If it is the proprietary video player, the start frame is noted (step 1110); the replay frame (step 1112); and the frame speed or frequency (step 1114). If it is the platform player and replay has been set, note the replay position (steps 1116 through 1118) or no replay (step 1120). Note the video frame lateral X and vertical movement Y within the presentation frame (steps 1122 through 1124). Finally, if the video has a perpetrator defined and note it (steps 1126 through 1128) and then store the Video/Audio sprite in the presentation (step 1132).

Figure 8:
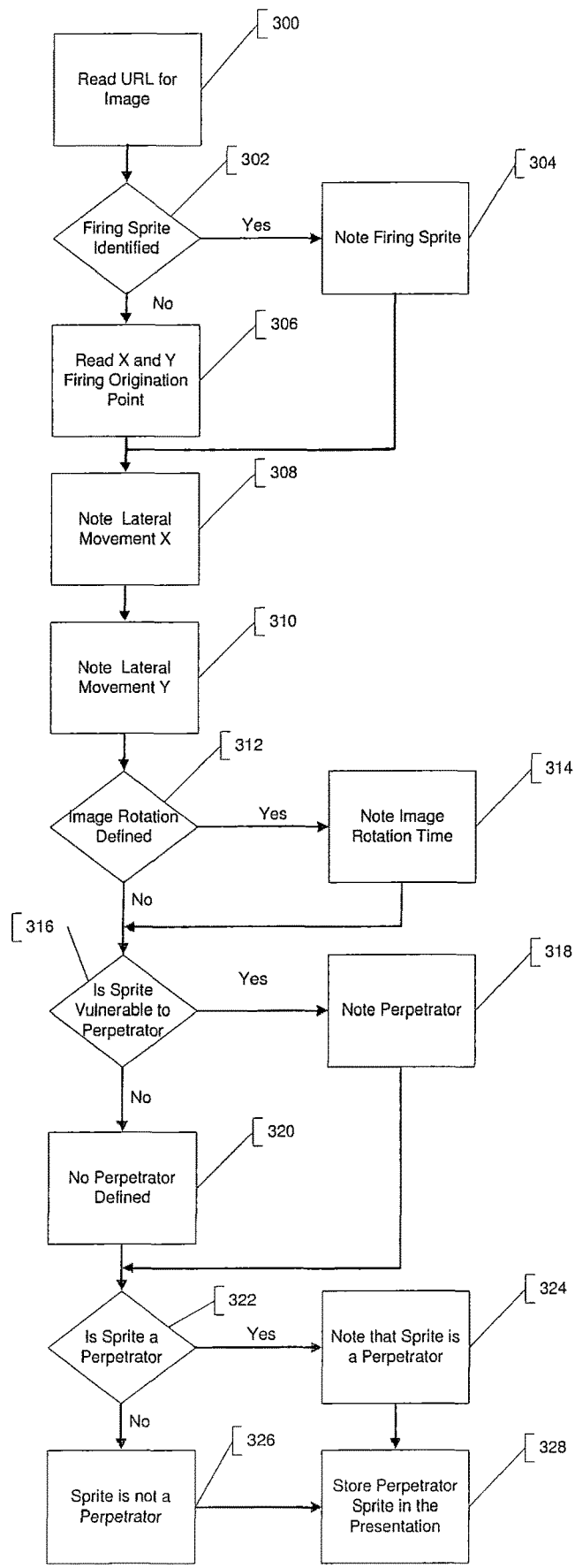
FIG. 8 is a flow diagram of the process for loading instructions for a Projectile Sprite into the invention.

FIG. 8 is a flow diagram that describes how a Projectile Sprite is added to a Presentation by the invention. A Projectile Sprite is similar to a Lateral Vertical Sprite, but its movements are in relation to a Firing Sprite. A Projectile Sprite must have a URL for the image to be displayed (step 300). The Firing Sprite, which can be any other Sprite but another Projectile Sprite, can be specified in the instructions (steps 302 and 304). If no Firing Sprite is specified, then the X and Y coordinate for the firing origination point is read from the instructions (step 306). The lateral and vertical movement must be defined in the instructions for the Projectile Sprite (steps 308 and 310). If the image is to be changed, that is defined in the instructions (steps 312 and 314). Projectile Sprites can be perpetrators and it can also have a perpetrator defined (steps 316 through 326). The instructions for the Perpetrator Sprite are then stored in the Presentation (step 328).

Figure 9:
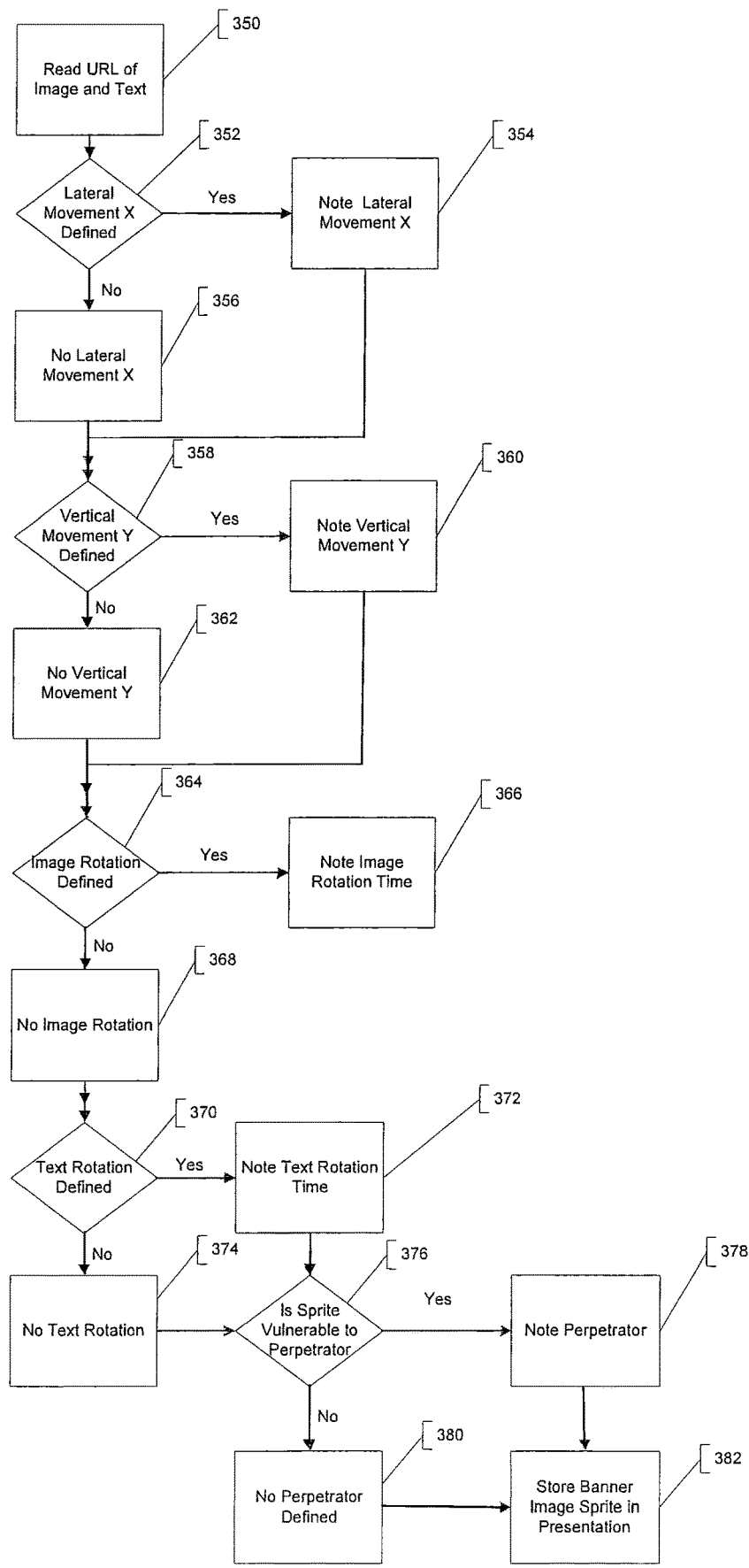
FIG. 9 is a flow diagram of the process for loading instructions for a Rotating Banner Text Sprite into the invention.

FIG. 9 is a flow diagram that describes how a Rotating Banner Text Sprite is created by the invention for a Presentation. A Rotating Banner Text Sprite is a series of images which appear as a banner on the device screen. Text may also be displayed on the Sprite. The images for the banner and the text may be changed or rotated during the Presentation.

The instructions for a Banner Sprite must include the URL and text to be displayed (step 350). The instructions may also include text for the Sprite (step 350). A Banner Text Sprite may also move either laterally or vertically or both (steps 352 through 362). The image and or the text on the Banner Text Sprite can change during the Presentation (steps 364 through 374) If the Sprite has a perpetrator defined that is read from the instructions (steps 376 and 380). After the instructions for the Banner Text Sprite have been read, it is saved in the Presentation (step 382).

Figure 10:
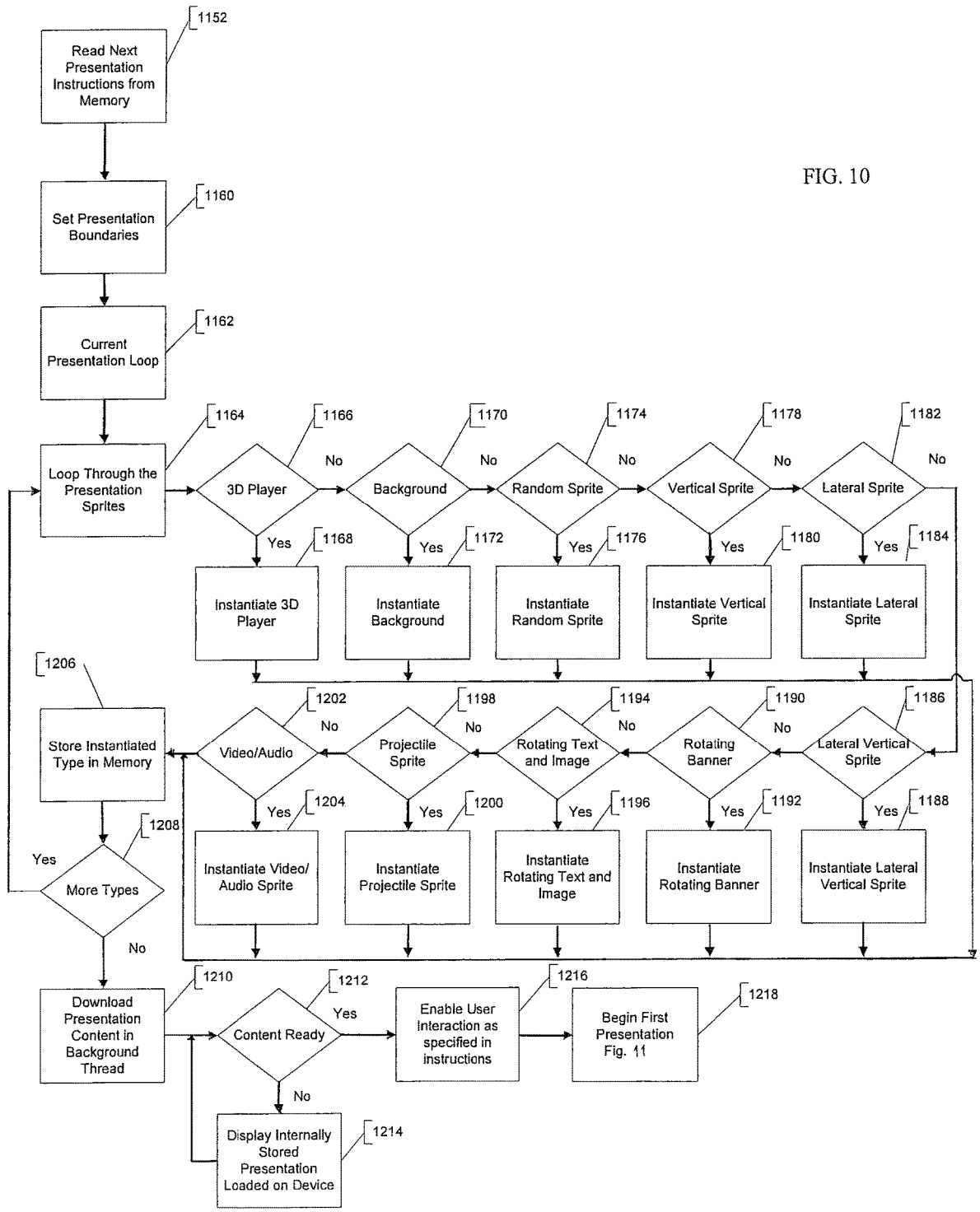
FIG. 10 is a flow diagram of the process of building a Presentation that has been loaded into the invention, adding video/audio and 3D Player and activating user interaction.

FIG. 10 is a flow diagram of how the Presentations are built by the invention and displayed on the mobile networked device. In a background thread in the invention running on the device, instructions are loaded from memory in FIG. 3 (step 1152). The invention then sets the boundaries of the Presentation as specified in the instructions (step 1160). All movement and location of the Presentation components will be governed by these coordinate boundaries as well as how the Presentation fits with other components in the application on the screen.

The invention then loops through the Presentation types defined in the instructions and instantiates each Presentation Sprite, Background, video or 3D using the graphical capabilities of the programming language of the implementation (steps 1164 through 1204) and stores them in memory (step 1206). The various types are read and stored until all types for the Presentation have been processed (steps 1208 to step 1164). The Presentation content is then downloaded in a background thread (step 1210) and displays internally stored presentation or loading message until the content is ready (1212 through 1214). After all the Presentation Sprites have been created, the invention enables the user interaction on the device (step 1216) and starts the Presentation (step 1218 and goes to FIG. 11).

Figure 11:
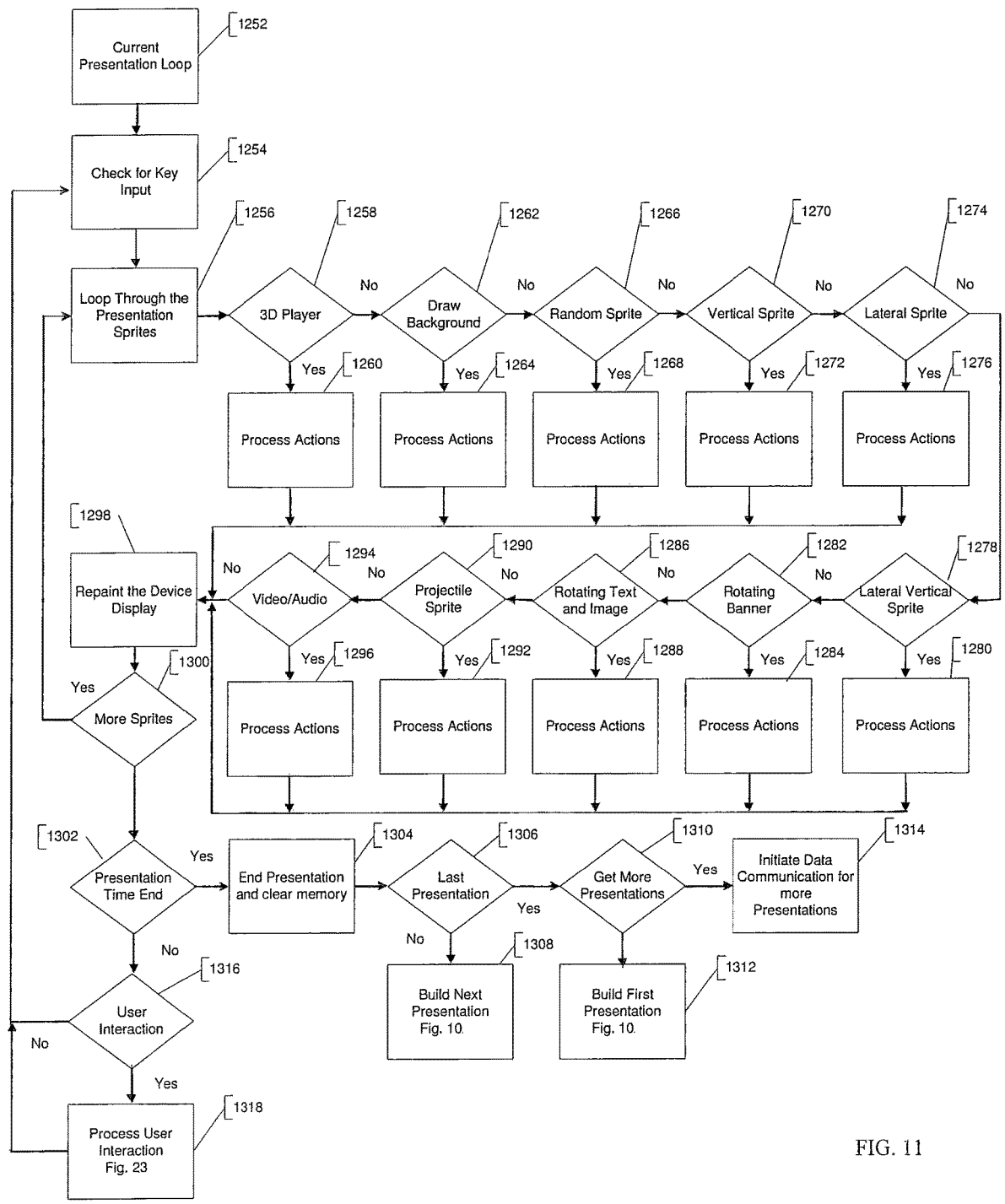
FIG. 11 is a flow diagram of the process of running a Presentation that has been loaded into the invention and adding user interaction, video/audio and 3D Player.

FIG. 11 is a flow diagram of how Presentations are displayed. Once Presentations are loaded, the invention creates a background thread (step 1252). In the control loop, the invention checks for user keyboard input (step 1254) and then loops through the array of Presentation objects; reads the instructions regarding the various object in the Presentation; passes the keyboard actions to the objects; and creates and or adjusts the behavior and location of the Sprites with the graphical capabilities of the implementation programming language (steps 1256 through 1296). After each Presentation object has been adjusted, the invention repaints the Presentation area of the device display (step 1298) and checks for more objects (step 1300).

If the Presentation time has elapsed (step 1302), the invention removes all objects from the screen, clears out the Presentation array and reclaims memory (step 1304). The invention then checks to see if this was the last Presentation (step 1306) and if not, it begins to build the next Presentation (FIG. 10) and presents it (step 1308). If another Presentation does not exist, it checks the instructions to see if it should initiate data communications to download more Presentations (step 1310). If so, the invention begins data communications to load more instructions for Presentations from the web application server (step 1314), and if not, it begins to load the first Presentation in memory (step 1312). An alternate implementation is to initiate data communication and download new instructions for Presentations before the end of the last Presentation currently running on the mobile networked device.

Figure 12:
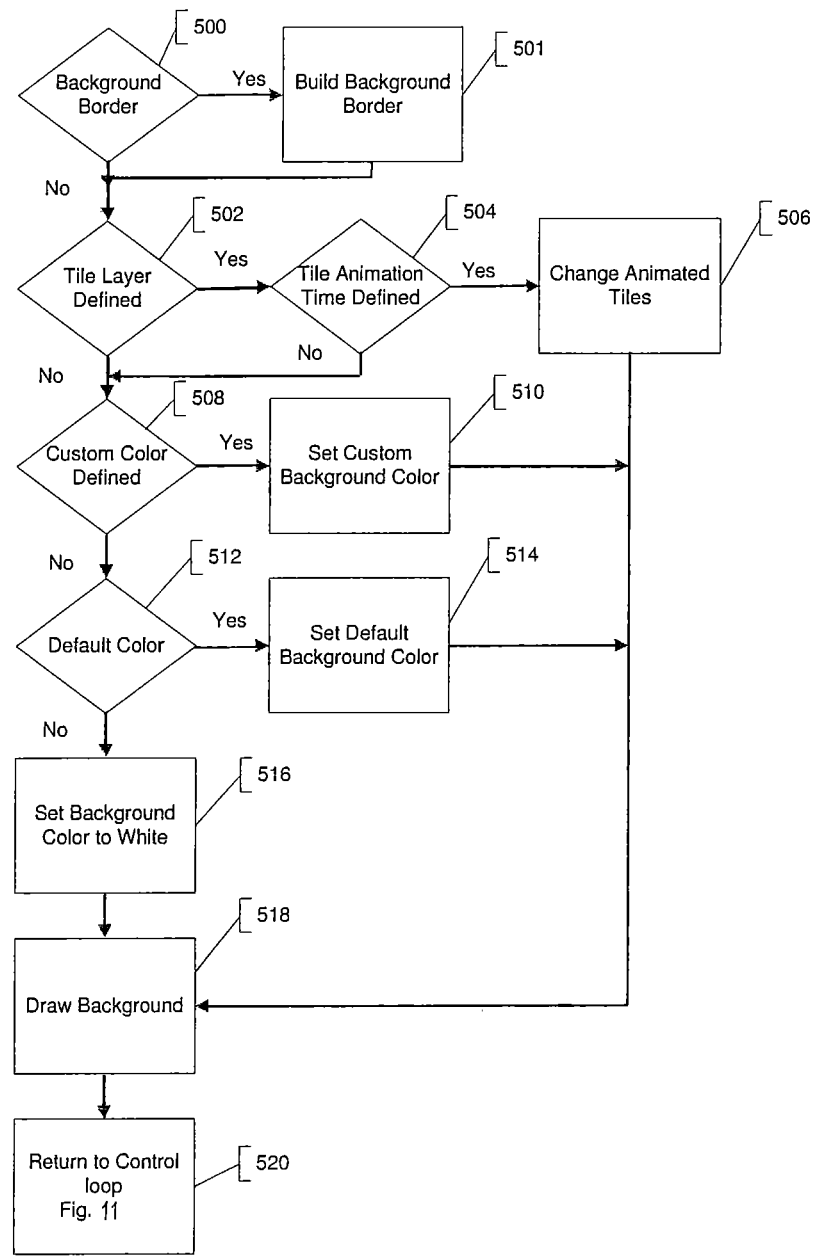
FIG. 12 is a flow diagram of the process of controlling the Presentation Background that has been loaded into the invention.

FIG. 12 is a flow diagram that describes how a Background is created by the invention for a Presentation. If a Background boarder is specified in the instructions, then it is drawn (step 500 and 501). If a Tiled Layer has been defined for the Presentation (step 502), then a check is done to see if tile animation has been defined (step 504) and if so, the tiles are changed (step 506). If a Tiled Layer has not been defined for the in the instructions for the Presentation, then a check is done to see if a custom Background color has been specified (step 508). If a custom color is defined for the Presentation, then the custom color is set for the Background (step 510). If one of the default colors has been chosen (step 512), then the chosen default color is set for the Background (step 514). If no Background has been defined for the Presentation, then the Background color is set to white (step 516). The Background is then drawn (step 518) and control is returned to the Presentation Control Loop (step 520).

Figure 13:
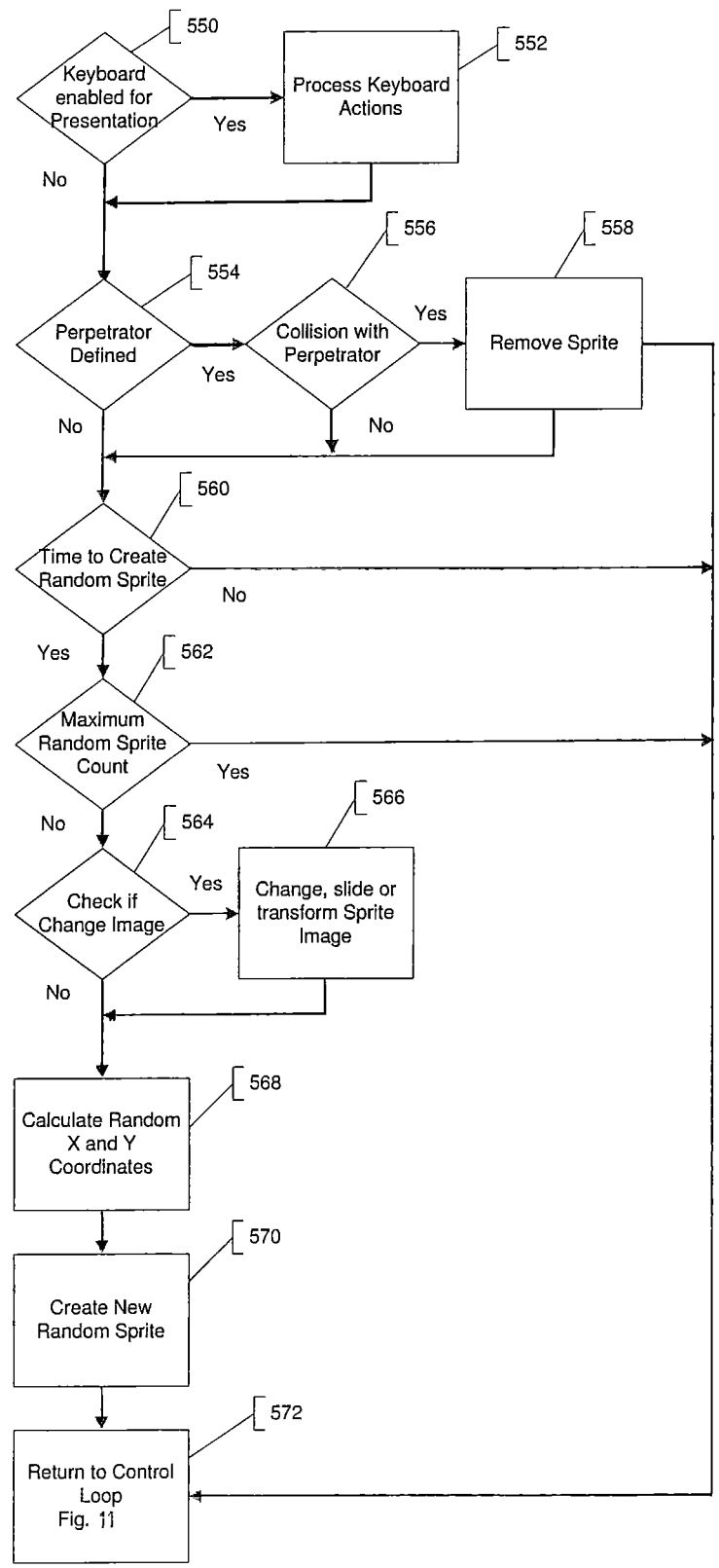
FIG. 13 is a flow diagram of the process of controlling a Random Sprite that has been loaded into the invention.

FIG. 13 is a flow diagram that describes how a Random Sprite is created and behaves in the invention. If a Random Sprite has been defined in the instructions for the Presentation, a check is made to determine if keyboard actions are enables for the Sprite (step 550) and if so, the keyboard actions are processed (step 552). A check is then done to see if a Perpetrator Sprite has been defined (step 554) and if so, a check is made to determine which Random Sprite has had a collision with the Perpetrator Sprite (step 556). If a collision has occurred with any Random Sprites previously created, they are removed from the Presentation (step 558).

If the time between Random Sprite creation has not expired (step 560), then control is returned to the Presentation Control Loop (step 572). If it is time to create a Random Sprite, a check is done to see if the maximum Sprite count has been exceeded (step 562). If the count is above the maximum count defined, then control is returned to the Presentation Control Loop (step 572). Otherwise, a check is made to see if image change has been defined for the Random Sprite creation (step 564) and if so, the image is rotated (step 566). The random X and Y coordinates for placement of the Random Sprite on the Presentation are calculated (step 568) and the Random Sprite is created (step 570). Control is then returned to the Presentation Control Loop (step 572).

Figure 14:
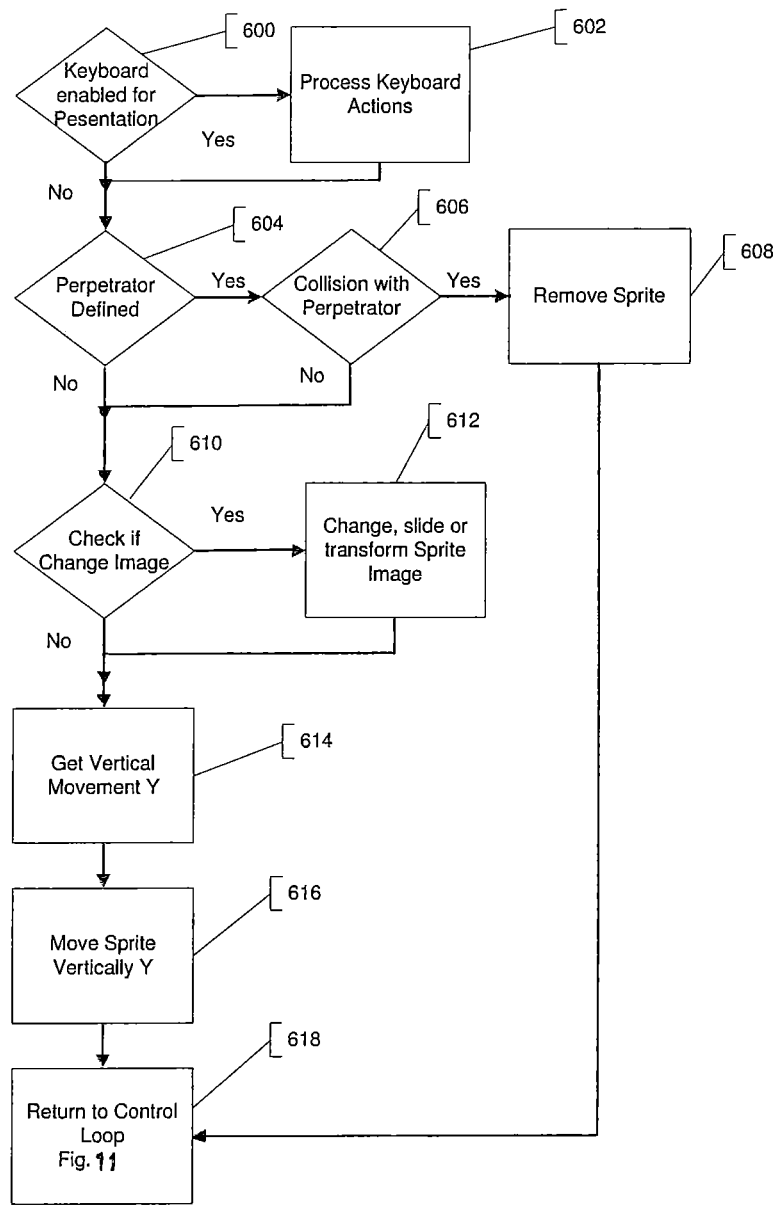
FIG. 14 is a flow diagram of the process of controlling a Vertical Moving Sprite that has been loaded into the invention.

FIG. 14 is a flow diagram that describes how a Vertical Moving Sprite is created and behaves in the invention. If a Vertical Moving Sprite has been defined in the instructions for the Presentation, a check is done to determine if keyboard actions are enabled for the Sprite (step 600) and if so, the keyboard actions are processed (step 602). A check is then done to see if a Perpetrator Sprite has been defined (step 604) and if so, a check is made to determine if the Vertical Moving Sprite has had a collision with the Perpetrator Sprite (step 606). If a collision has occurred with the Perpetrator Sprite, the Vertical Moving Sprite is removed from the Presentation (step 608).

A check is then done to see if image change has been defined for the Vertical Moving Sprite (step 610) and if so, the image is rotated (step 612). The Y coordinate is then determined for placement according to the instructions and any keyboard input (step 614) and the Sprite is moved (step 616). Control is then returned to the Presentation Control Loop (step 618).

Figure 15:
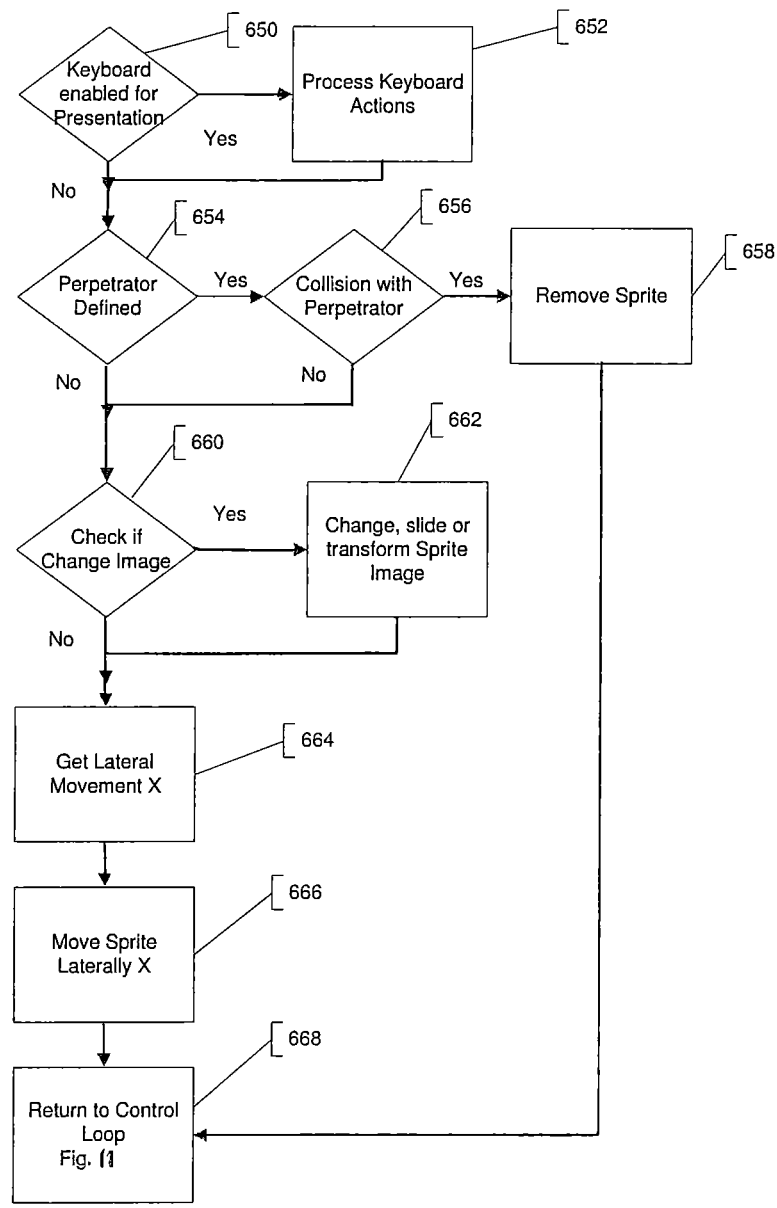
FIG. 15 is a flow diagram of the process of controlling a lateral moving Sprite that has been loaded into the invention.

FIG. 15 is a flow diagram that describes how a Lateral Moving Sprite is created and behaves in the invention. If a Lateral Moving Sprite has been defined in the instructions for the Presentation, a check is done to determine if keyboard actions are enables for the Sprite (step 650) and if so, the keyboard actions are processed (step 652). A check is then made to see if a Perpetrator Sprite has been defined in the instructions for the Presentation (step 654) and if so, a check is done to determine if the Lateral Sprite has had a collision with the Perpetrator Sprite (step 656). If a collision has occurred with the Perpetrator Sprite, the Lateral Sprite is removed from the Presentation (step 658).

A check is then done to see if image change has been defined in the instructions for the Lateral Sprite (step 660) and if so, the image is rotated (step 662). The X coordinate is then determined for placement according to the instructions and any keyboard input (step 664 and 666). Control is then returned to the Presentation Control Loop (step 668).

Figure 16:
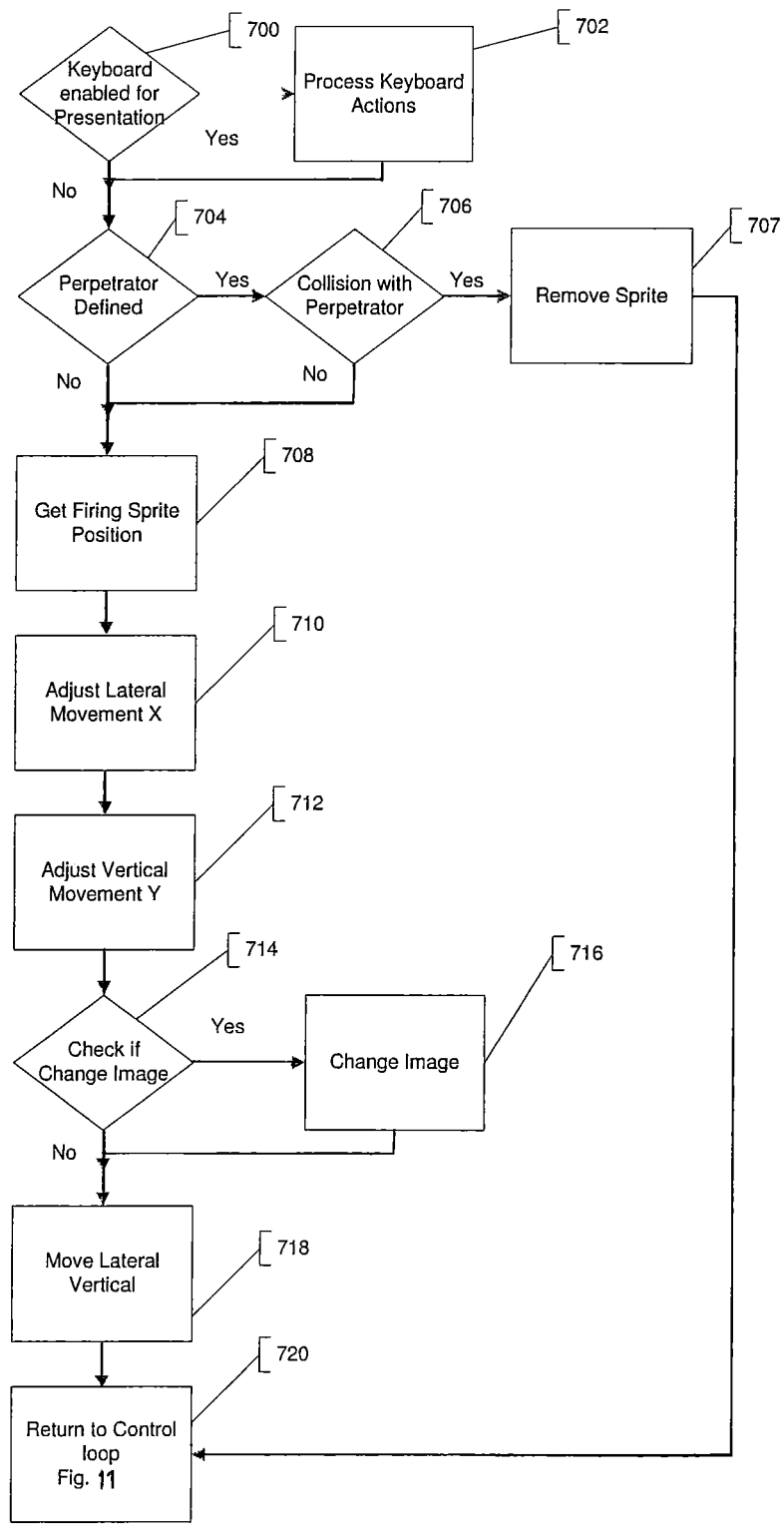
FIG. 16 is a flow diagram of the process of controlling a Projectile Sprite that has been loaded into the invention.

FIG. 16 is a flow diagram that describes how a Projectile Sprite is created and behaves in the invention. If a Projectile Sprite has been defined in the instructions for the Presentation, a check is done to determine if keyboard actions are enabled for the Sprite (step 700) and if so, the keyboard actions are processed (step 702). A check is then done to see if a Perpetrator Sprite has been defined in the instructions for the Presentation (step 704) and if so, a check is made to determine if any of the Projectile Sprites have had a collision with the Perpetrator Sprite (step 706). If a collision has occurred with the Perpetrator Sprite, the Projectile Sprite is removed from the Presentation (step 707) and control is then returned to the Presentation Control Loop (step 720).

The X and Y coordinate of the Sprite designated as the Firing Sprite is then determined for origination of the movements of the Projectile Sprite (step 708). The X and Y coordinates is then determined for placement in reference to the Firing Sprite location according to the instructions and any keyboard input (step 710 and 712). A check is then done to see if image change has been defined for the Projectile Sprite (step 714) and if so, the image is rotated (step 716). The Projectile Sprite is then moved (step 718) and control is then returned to the Presentation Control Loop (step 720).

Figure 17:
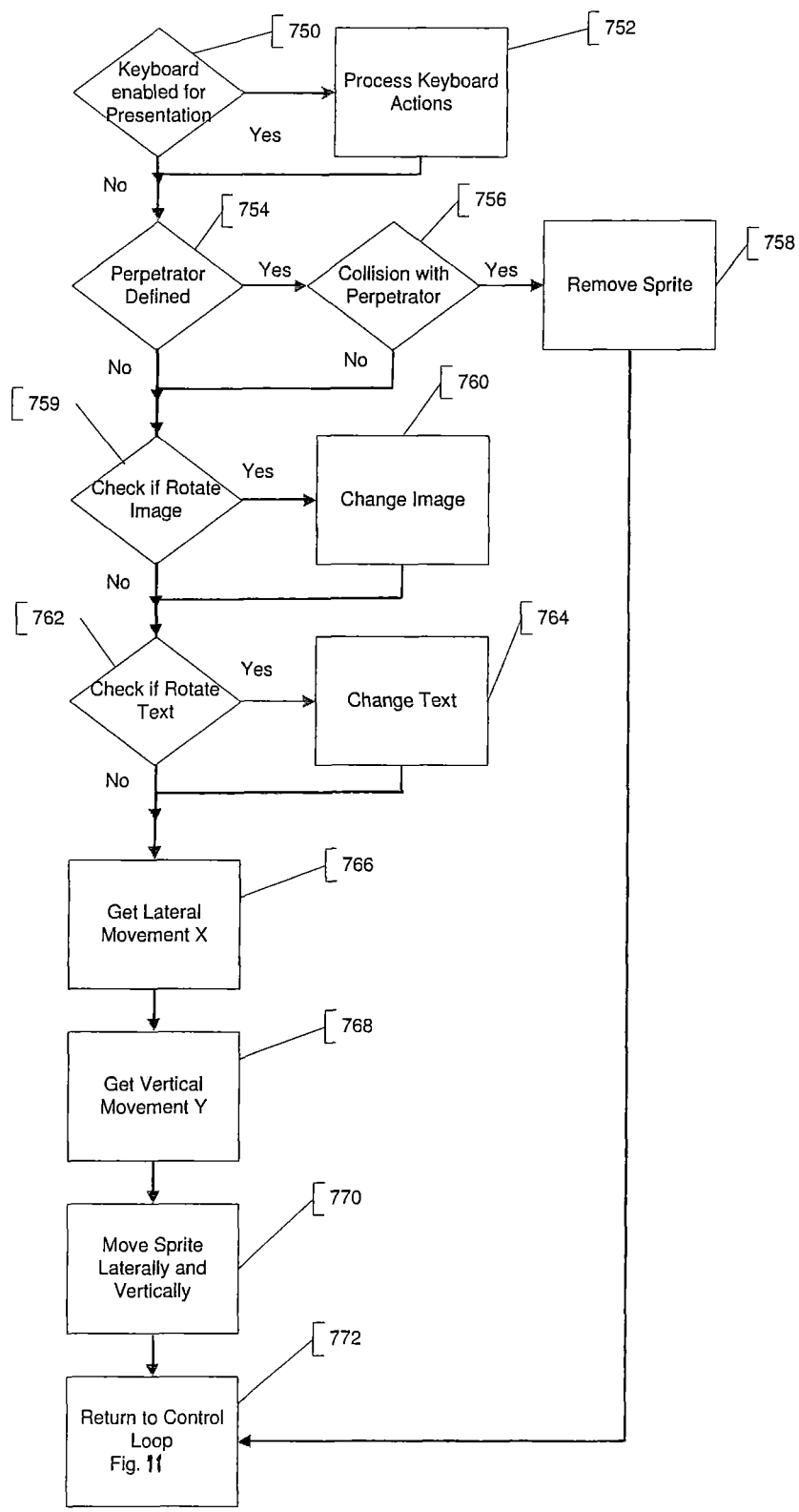
FIG. 17 is a flow diagram of the process of controlling a Rotating Banner and Text Sprite that has been loaded into the invention.

FIG. 17 is a flow diagram that describes how a Rotating Banner Text Sprite is created and behaves in the invention. If a Rotating Banner Text Sprite has been defined in the instructions for the Presentation, a check is done to determine if keyboard actions are enables for the Sprite (step 750) and if so, the keyboard actions are processed (step 752). A check is then done to see if a Perpetrator Sprite has been defined (step 754) and if so, a check is made to determine if the Rotating Banner Text Sprite has had a collision with the Perpetrator Sprite (step 756). If a collision has occurred with the Perpetrator Sprite, the Rotating Banner Text Sprite is removed from the Presentation (step 758) and control is then returned to the Presentation Control Loop (step 772).

A check is then done to see if image change has been defined in the instructions for the Rotating Banner Text Sprite (step 759) and if so, the image is rotated (step 760). If rotate text has been defined for the Rotating Banner Text Sprite (step 762), the text is rotated (step 764).

The X and Y coordinates are then determined for placement according to the instructions and any keyboard input (step 766 and 768). Rotating Banner Text Sprite is then moved on the Presentation (step 770). The Control is then returned to the Presentation Control Loop (step 772).

Figure 18:
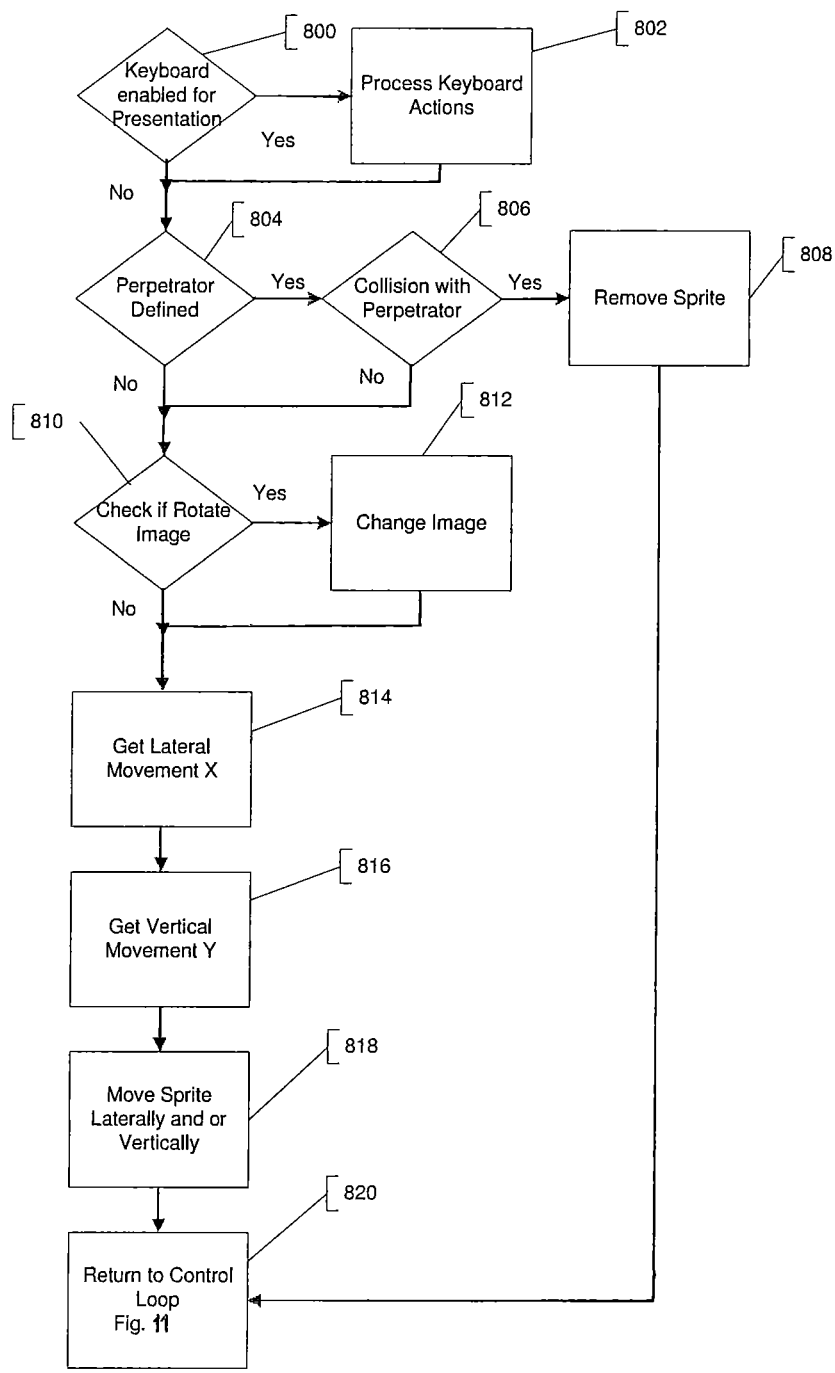
FIG. 18 is a flow diagram of the process of controlling a Rotating Banner Sprite that has been loaded into the invention.

FIG. 18 is a flow diagram that describes how a Rotating Banner Sprite is created and behaves in the invention. If a Rotating Banner Sprite has been defined in the instructions for the Presentation, a check is done to determine if keyboard actions are enables for the Sprite (step 800) and if so, the keyboard actions are processed (step 802). A check is then done to see if a Perpetrator Sprite has been defined in the instructions for the Presentation (step 804) and if so, a check is made to determine if the Rotating Banner Sprite has had a collision with the Perpetrator Sprite (step 806). If a collision has occurred with the Perpetrator Sprite, the Rotating Banner Sprite is removed from the Presentation (step 808) and control is then returned to the Presentation Control Loop (step 820).

A check is then done to see if image change has been defined for the Rotating Banner Sprite (step 810) and if so, the image is rotated (step 812).

The X and Y coordinates are then determined for placement according to the instructions and any keyboard input (step 814 and 816). Rotating Banner Sprite is then moved on the Presentation (step 818). Control is then returned to the Presentation Control Loop (step 820).

Figure 19:
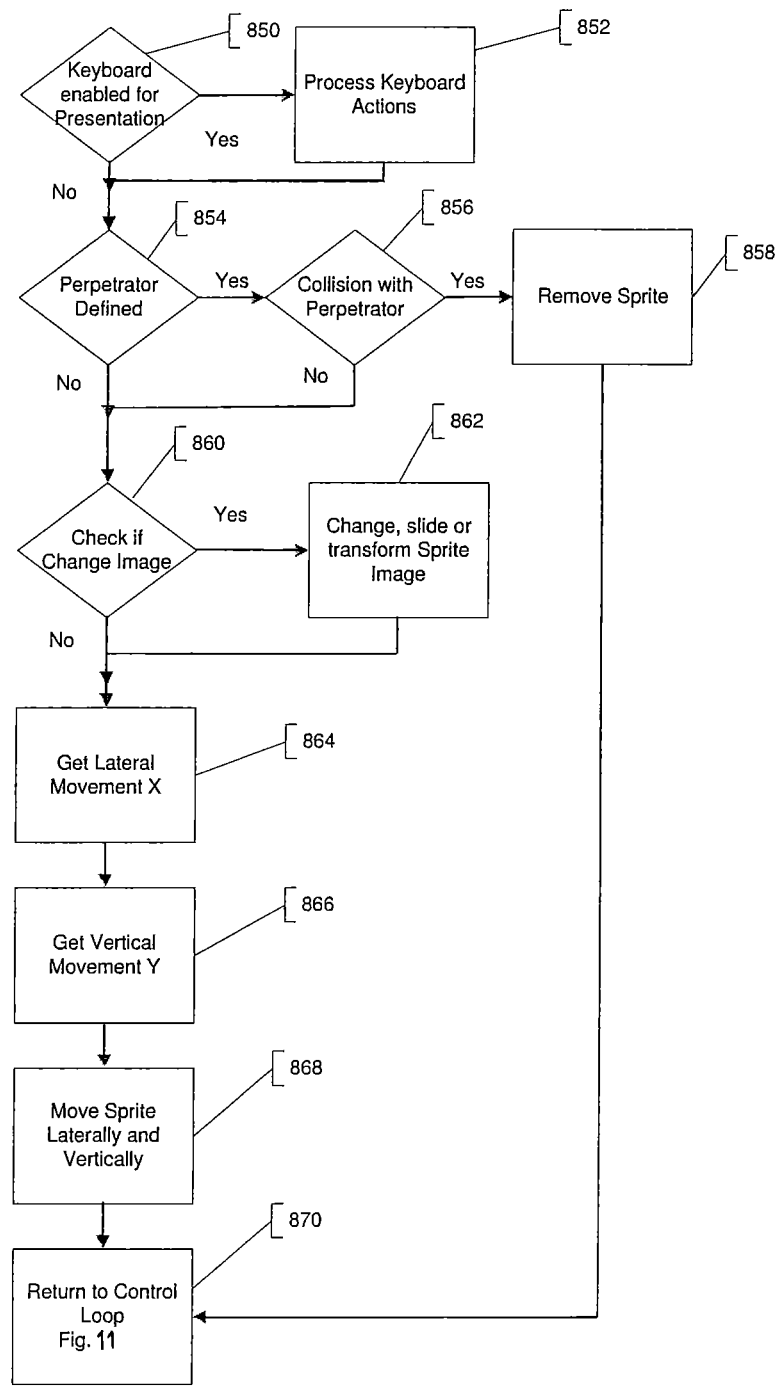
FIG. 19 is a flow diagram of the process of controlling a Lateral and Vertical Moving Sprite that has been loaded into the invention.

FIG. 19 is a flow diagram that describes how a Lateral Vertical Moving Sprite is created and behaves in the invention. If a Lateral Vertical Sprite has been defined in the instructions for the Presentation, a check is done to determine if keyboard actions are enables for the Sprite (step 850) and if so, the keyboard actions are processed (step 852). A check is then done to see if a Perpetrator Sprite has been defined in the instructions for the Presentation (step 854) and if so, a check is made to determine if the Lateral Vertical Sprite has had a collision with the Perpetrator Sprite (step 856). If a collision has occurred with the Perpetrator Sprite, the Lateral Vertical Sprite is removed from the Presentation (step 858) and control is then returned to the Presentation Control Loop (step 870).

A check is then done to see if image change has been defined for the Lateral Vertical Sprite (step 860) and if so, the image is rotated (step 862). The X and Y coordinates are then determined for placement according to the instructions and any keyboard input (step 864 and 866). The Lateral Vertical Sprite is then moved on the Presentation (step 868). Control is then returned to the Presentation Control Loop (step 870).

Figure 20:
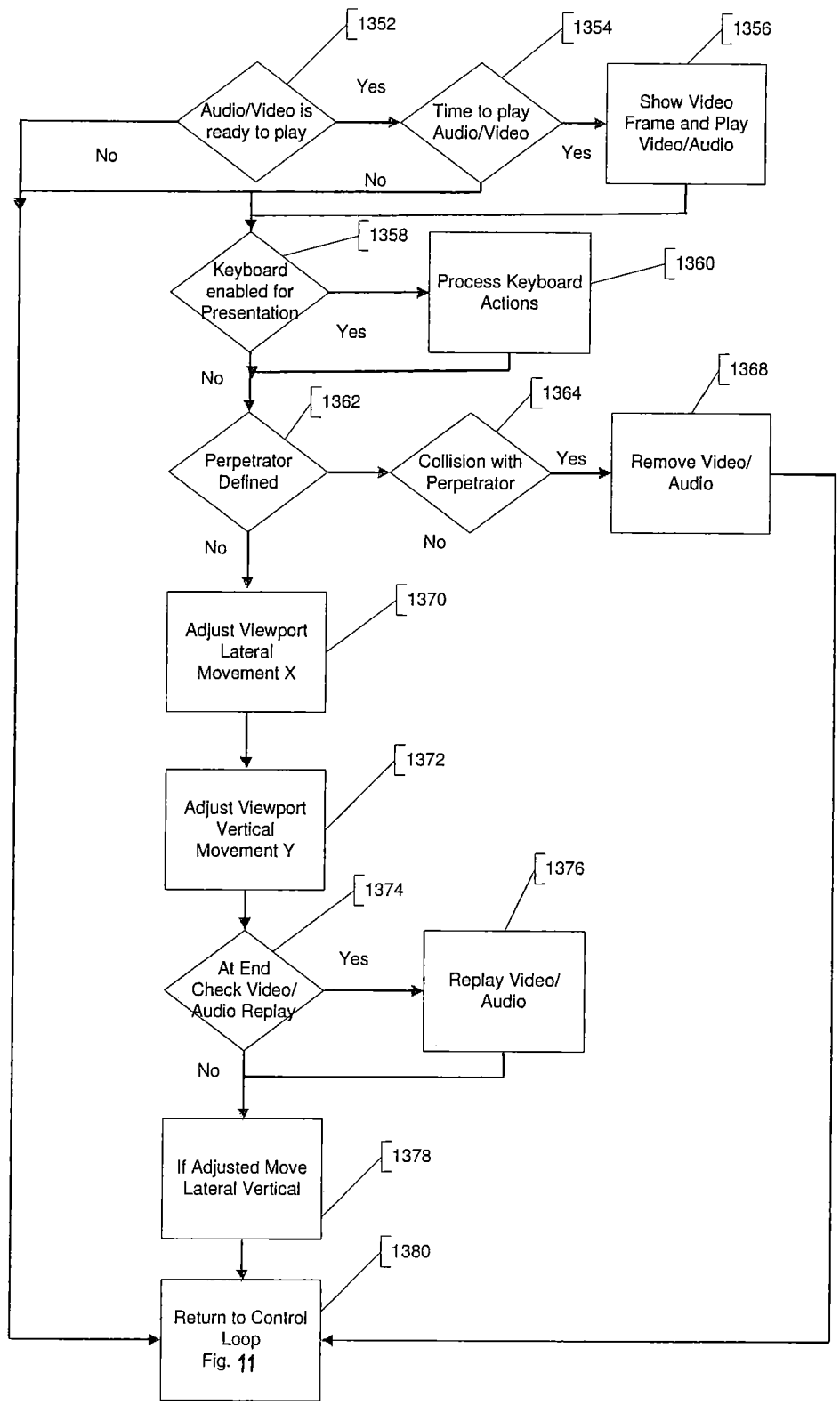
FIG. 20 is a flow diagram of the process of controlling a video/audio platform player Sprite that has been loaded into the invention.

FIG. 20 is a flow diagram to show how the platform video player is presented. First check to see if the video is ready to play (step 1352). If it is time to play the video in the presentation (step 1354), show the frame and play the video (step 1356). Check if the keyboard is enabled for the presentation and if so, process the keyboard actions (steps 1358 through 1360). If a perpetrator is defined, then check for a collision with the perpetrator frame and if so, remove the video from the presentation (steps 1362 through 1368). Adjust the frame for lateral and vertical movement if defined (steps 1370 through 1372). Then, if at end, check for replay and replay the video (steps 1374 through 1376). Move the frame lateral or vertical if adjusted (step 1378) and return to the control loop (step 1380).

Figure 21:
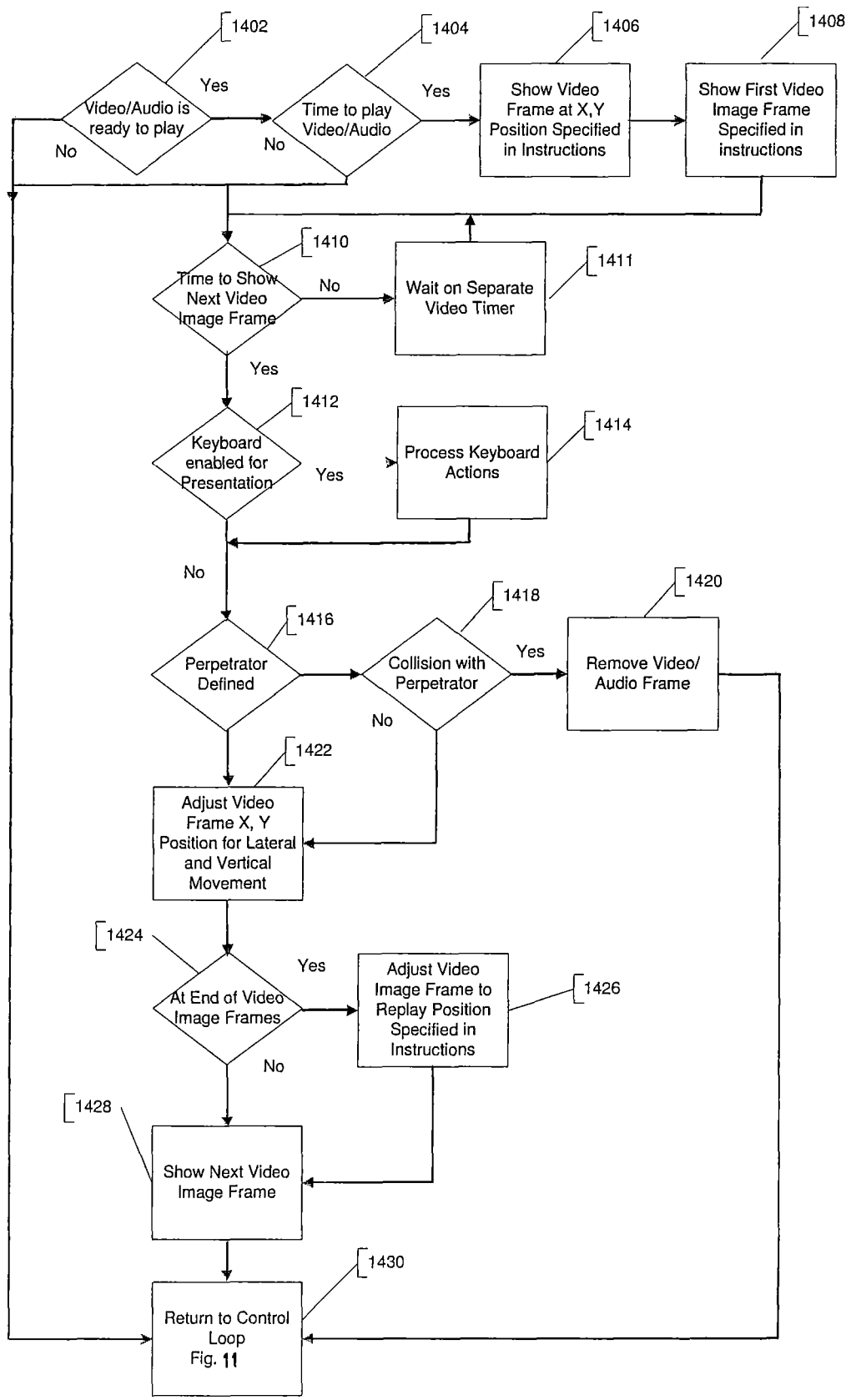
FIG. 21 is a flow diagram of the process of controlling a video/audio invention player Sprite that has been loaded into the invention.

FIG. 21 is a flow diagram to show how the proprietary video player is presented. First check to see if the video is ready to play (step 1402). If it is time to play the video in the presentation (step 1404), show the frame and play the video at the x and y position specified in the instructions (step 1406) and show the first image frame specified in the instructions (Step 1408). Next check to see if it is time to display the next image frame (step 1410) and if not wait on special video frame speed or frequency set from instructions in FIG. 7B (Step 1411). But if it is time to display the next image frame, perform these steps: check first if keyboard is enabled and process key actions; check if perpetrator has been defined and remove if a collision with perpetrator has occurred; adjust video frame for lateral and vertical movement if defined; and check for end of video and set to replay position from FIG. 7B (steps 1412 through 1426). Finally show the next video frame (step 1428) and return to the control loop (step 1430).

Figure 22:
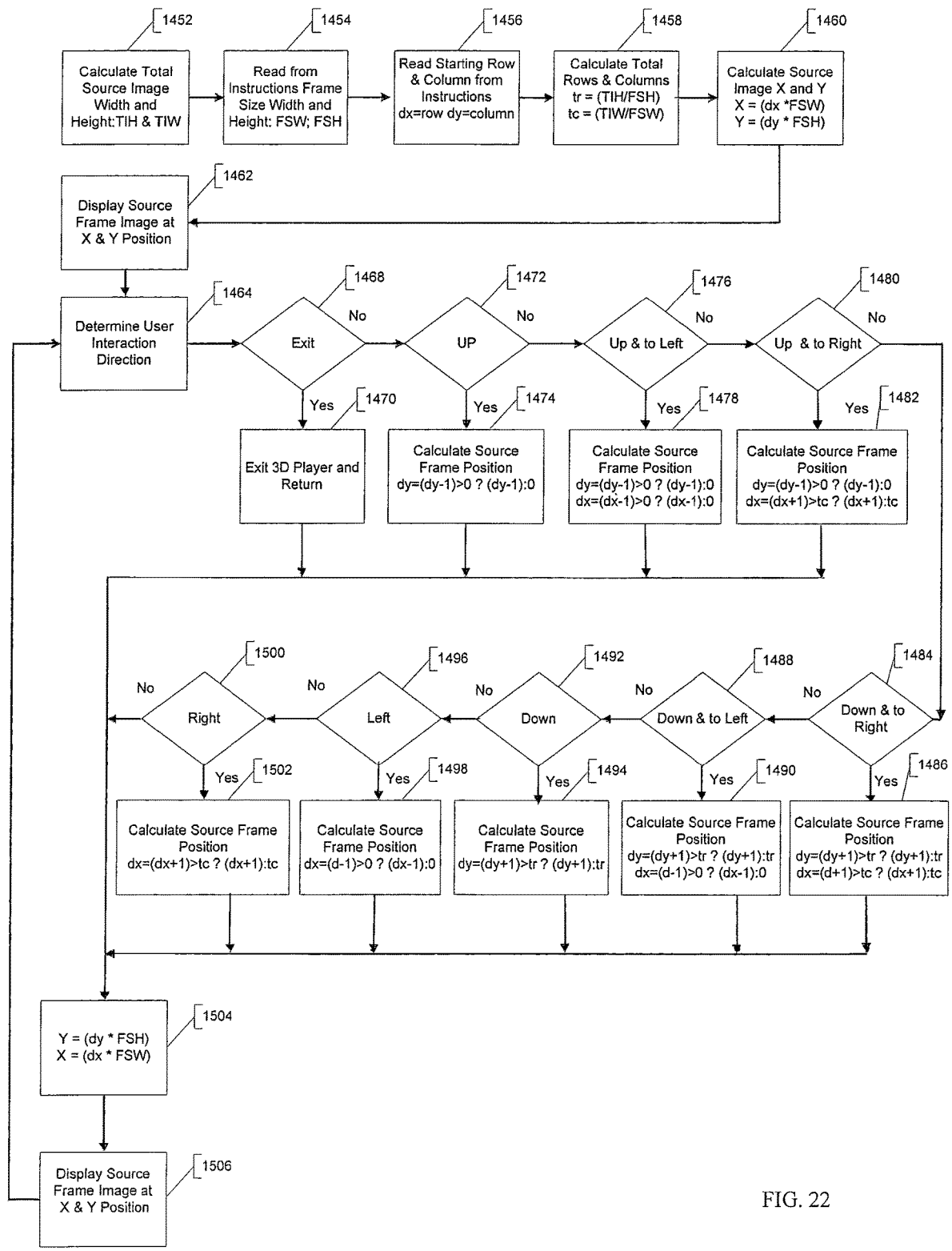
FIG. 22 is a flow diagram of the process of controlling a 3D invention player that has been loaded into the invention.

FIG. 22 is a flow diagram to show how the 3D player is presented. First calculations are performed: total image width (TIW) and height (TIH) are found from methods in all the platform SDK (step 1452); then read the frame width (FSW) and height (FSH) as well as the starting row and column (dx and dy) provided in the instructions (steps 1454 through 1456); then calculate the total number of rows and columns (step 1458) and the X and Y in the source image (step 1460). Then display the first frame (step 1462). With the first frame displayed, check for user interaction (step 1464) and act on the interaction directing for which frame to display or exit-double click for touch (steps 1468 through 1502). Using the calculated values from interface direction calculate and display the frame (steps 1504 through 1506).

Figure 23:
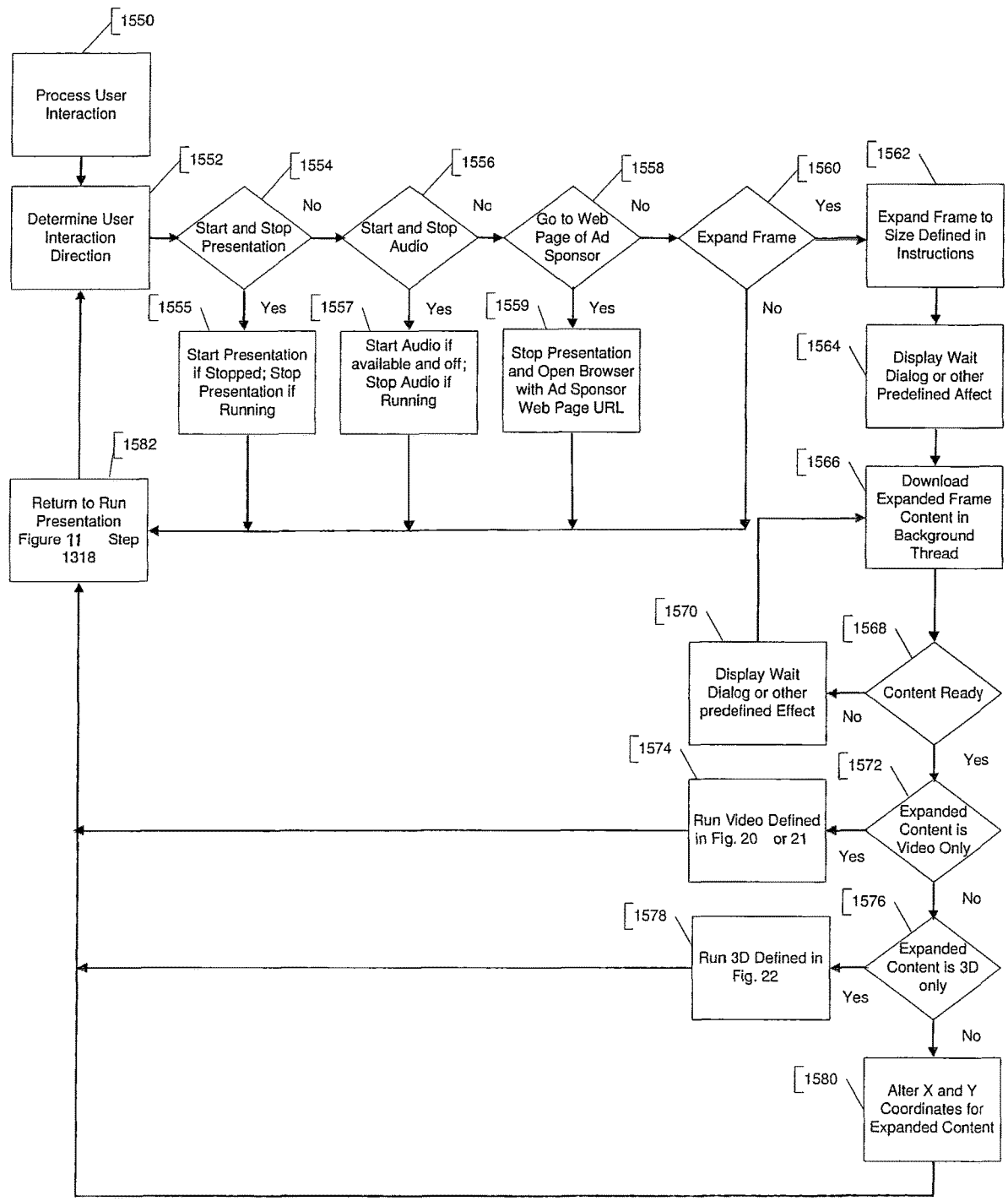
FIG. 23 is a flow diagram of the process of controlling user interaction as activated according to the instructions.

FIG. 23 is a flow diagram to show how user interaction affects the presentation. The user interaction is processed and direction is determined (steps 1550 through 1552). The user interaction enabled for the presentation are start and stop presentation (steps 1554 through 1555); start and stop audio, if available (steps 1556 through 1557); go to web page of ad sponsor (steps 1558 through 1559); and expand form if enabled for presentation (step 1560). If it is expand form, the presentation frame is expanded to the size defined in the instructions (step 1562), with a wait dialog displayed (step 1564-1570). Expanded content can be either video with platform player or proprietary player (steps 1572 through 1574); 3D player (steps 1576 trough 1578); or larger content images to display for same presentation (step 1580). Once the expanded content has played or user interface direction is not recognized, control returns to the presentation (step 1582).

Figure 25:
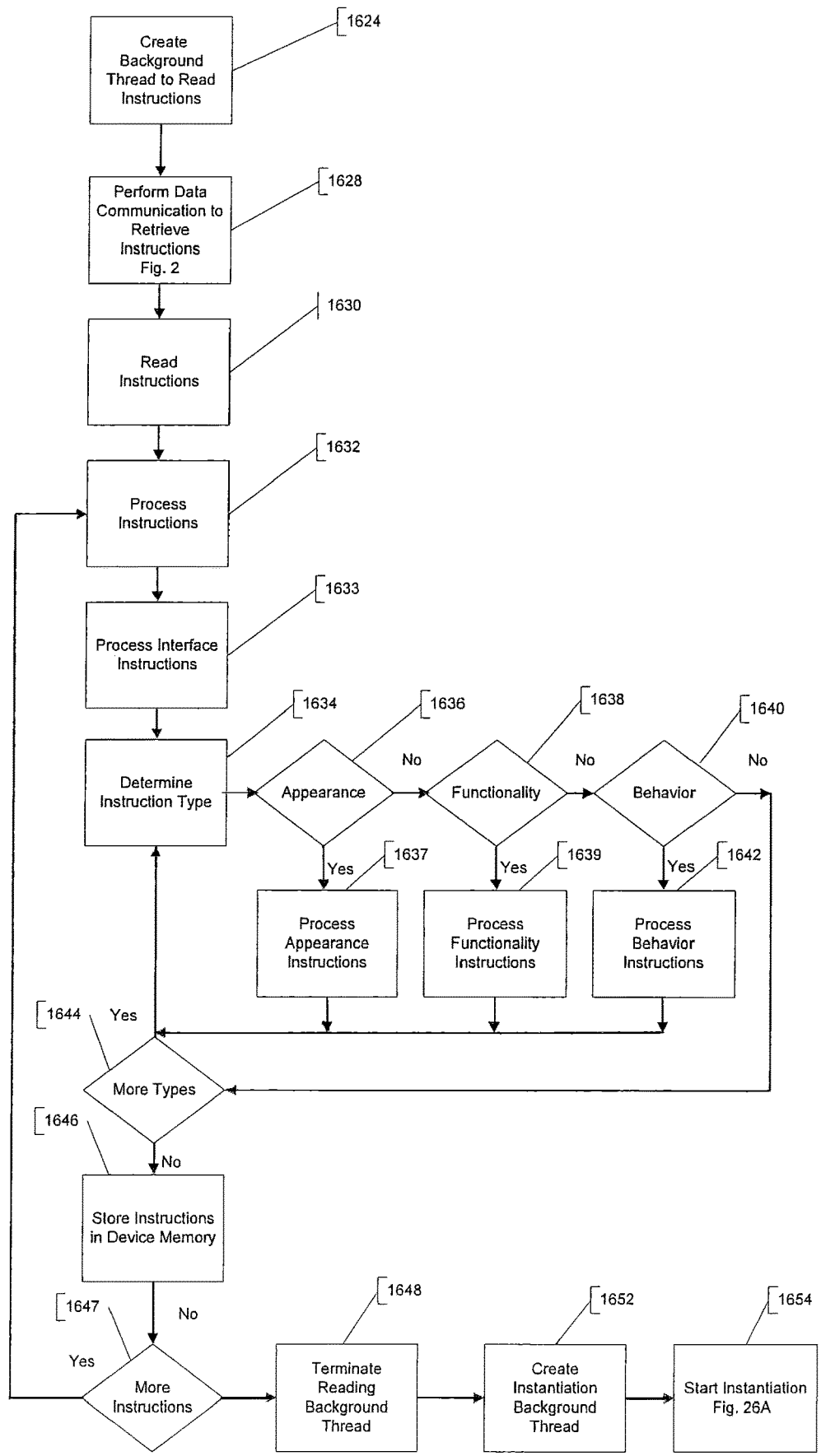
FIG. 25 is a flow diagram of the method used by the invention to load instructions sent by the web application server to the mobile networked device to trigger the compiled code previously loaded on the device to exhibit and change appearance, functionality and behavior.

FIG. 25 is a flow diagram for reading instructions for the general method of the invention. First a background thread is instantiated and started to read the instructions (step 1624). Data communication is performed to retrieve instructions (step 1628) as in FIG. 2. A background thread is started to read instructions from data communication in FIG. 2 (steps 1624 through 1628). The instructions are read and processed (steps 1630 through 1632), including the interface instructions (step 1633). Then the instruction type is determined and processed (steps 1634 through 1642). If there are more types then continue to process them (step 1644 to 1634) and if not then store the instructions in memory (step 1646). If there are more instructions (step 1647), then process more instructions (step 1632). If no more instructions, then terminate the background thread (step 1648) and create the triggering background thread (step 1652) and go to FIG. 26A (step 1654).

Figure 26A:
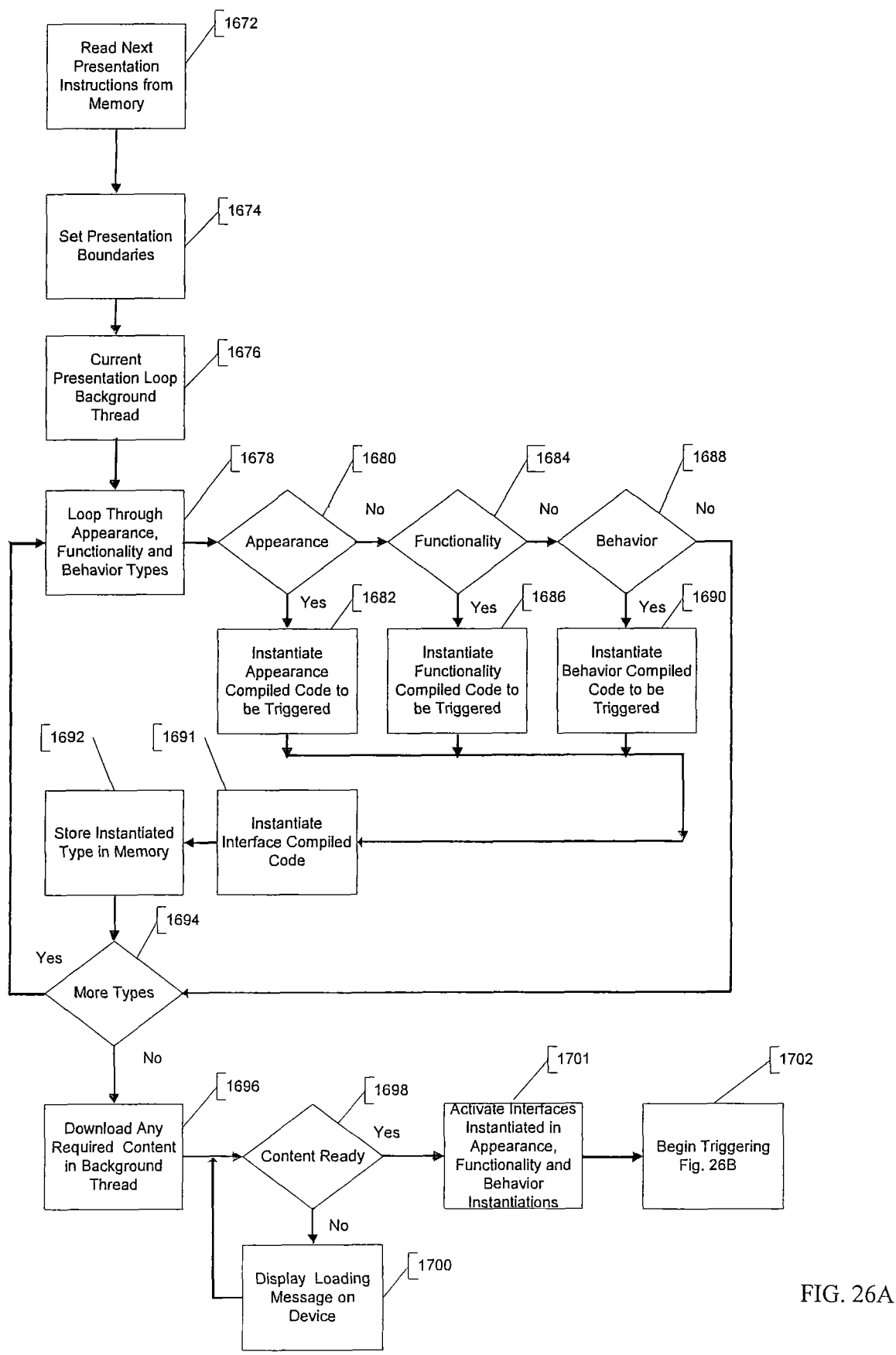
FIG. 26A is a flow diagram of the method used by the invention to trigger the instantiation of objects in memory on the device to exhibit and change appearance, functionality and behavior in the compiled code previously loaded on the device.

FIG. 26A is a flow diagram for instantiating the compiled code directed by the instructions read and stored in FIG. 25. First the instructions are read from memory (step 1672); presentation boundaries in the instructions are set (step 1674); and a control loop background thread is started (step 1676). The appearance, functionality and behavior types are looped through and the compiled code is instantiated for each type encountered (steps 1678 through 1690). Then the interface for the type is instantiated in the compiled code (step 1691) and then the instantiated type is stored in memory (step 1692). A check is done for more types and if so, then more types are processed (step 1694 through 1678).

Once all types have been instantiated, content for all types is downloaded in a background thread (step 1696 through 1700). Then the interfaces defined in the types are activated (step 1701) and triggering begins (step 1702).

Figure 26B:
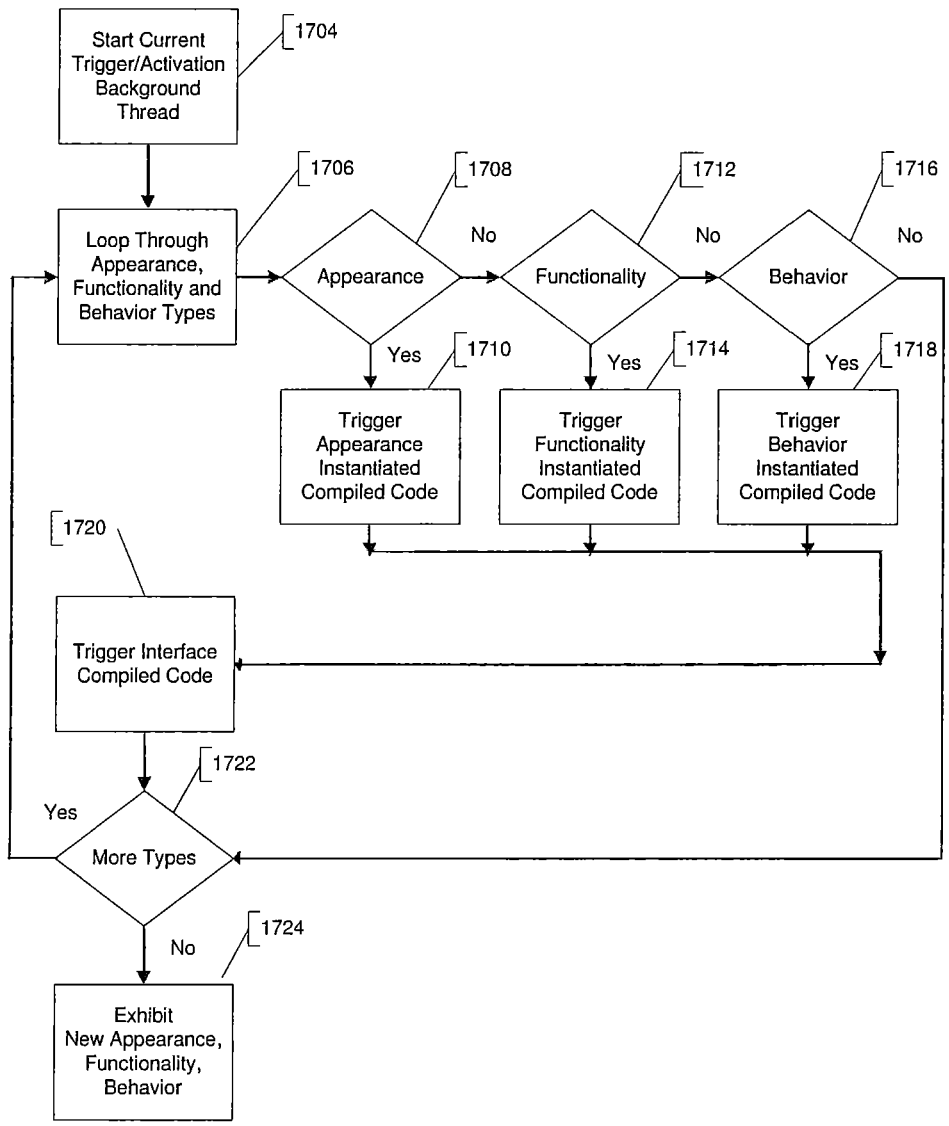
FIG. 26B is a flow diagram of the method used by the invention to trigger the instantiate objects in memory on the device to exhibit and change appearance, functionality and behavior in the compiled code previously loaded on the device.

FIG. 26B is a flow diagram for triggering the compiled code read in the instructions in FIG. 25 and then instantiated in FIG. 26A. First the triggering background thread control loop is started (step 1704). The appearance, functionality and behavior types are looped through and the instantiated compiled code is triggered for each type encountered (steps 1706 through 1718). Then the instantiated interface is triggered (step 1720) and if there are more, then more types are triggered (step 1722 to 1706). Finally the new appearance, functionality and behavior are exhibited (step 1724).

CONCLUSION

In accordance with the present disclosure, the ability to display and change animation as well as the video and 3D players is accomplished by the efficient and secure delivery of not compiled code instructions to trigger capability in compiled code previously downloaded and running on the mobile device. In a particular embodiment, the device will have specific capabilities (e.g., frame size, movement and timing), and each specific capability performs as a component of broader capability to display and change appearance, functionality and behavior on the device.

In the embodiments discussed herein, the instructions trigger execution of selected capability in compiled code loaded and running on the device to enable various animation Video and 3D player features. It will be appreciated, however, that such instructions can also be used to trigger capability to exhibit and change any appearance, functionality and behavior on a device such as color, physical configuration, logic, interface, user interface, and artificial intelligence.

In view of the foregoing, it will also be appreciated that the efficient and secure delivery of not compiled code instructions to trigger the execution of compiled binary code previously loaded and running on a device is a method in itself; and instructions could be devised to trigger any capability, similarly compiled and running, which display and change appearance, functionality and behavior. In particular, one could compile into binary code any appearance, functionality and behavior capability in combination with network communication and a listener that waits on interface events; load the code on a device; and then run the compiled binary code on the device; which requests and receives over a network at any time one or more not compiled code instructions; that trigger one or more compiled binary code capability loaded and running on the device to exhibit and change appearance, functionality and behavior on the device.

Therefore it is contemplated that instructions, which are characterized as other than compiled code, HTML or scripting language, may be used to trigger or activate capability in previously downloaded code to exhibit and change any appearance, behavior and functionality.

Accordingly, any appearance, functionality and behavior can be exhibited and changed on a device by new instructions requested and received at any time by compiled binary code loaded and running on the device, triggering different appearance, functionality and behavior capability in the compiled binary code loaded and running on the device, without having to recompile the code, download new code, or reprogram said device, and without the user having to download a new compiled application.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A device including a processor, said device comprising:
a network interface for communicating with a network;
an operating system;
a memory storage;
a display;
a platform for implementing compiled applications on said device;
a compiled application that is executable on the platform by said operating system, the compiled application being capable of receiving first instructions and second instructions from the network interface;
compiled executable code comprising a plurality of behaviors in portions of code for instantiation into objects, said compiled executable code being associated on the platform with the compiled application and stored in the memory storage;
wherein the compiled application has access to the platform to implement application components separately from the first instructions and second instructions and the compiled executable code, and the compiled application receives first instructions and second instructions from the network interface that are not comprised of compiled code;
wherein the first instructions upon receipt by said compiled application trigger a first instantiation of at least one of said portions of code into a first object for execution by said compiled application, the second instructions upon receipt by said compiled application trigger a second instantiation of at least one of said portions of code into a second object for execution by said compiled application, the second object comprising at least one different said portions of code from the first object;
wherein more than one compiled application is executable on the platform by said operating system and on platforms of a different type than said platform, and capable of using the access to a platform of a different type to implement application components separately and using the first and second instructions for triggering and executing portions of code; and
wherein said first instructions comprise a uniform resource locator (URL) associated with an image for display on the display, and with respect to the second instructions, said triggering of the portions of code comprises instantiating an application component object for display.

2. The device of claim 1 wherein said processor is for reclaiming memory from said instantiation of at least one of said portions of code into said objects.

3. The device of claim 1 wherein said processor is for reading said first instructions in data downloaded to said device.

4. The device of claim 1 wherein said first instructions comprise a message, bitmask or bitmap.

5. The device of claim 1 wherein said first instructions comprise a parameter specifying a period of time after which to obtain said second instructions, said second instructions different from said first instructions.

6. The device of claim 1 wherein said first instructions trigger said compiled application to obtain said second instructions, said second instructions different from said first instructions.

7. The device of claim 1 wherein said compiled executable code is embedded within said compiled application.

8. The device of claim 1 wherein said compiled executable code is stored separately from said compiled application.

9. The device of claim 1 wherein said operating system is for receiving said first instructions and second instructions for subsequent receipt by said compiled application.

10. The device of claim 1 further comprising:
a user interface for receiving user input;
wherein a portion of said first instructions are not for display on said display.

11. The device of claim 10 wherein said first instructions comprise a uniform resource locator (URL) wherein said URL is associated with an image for display on said display.

12. The device of claim 11 wherein said image changes in response to input received from said user interface.

13. The device of claim 10 wherein said first instructions comprise a uniform resource locator (URL) for a text file comprising text for display by said compiled application on said display.

14. The device of claim 13 wherein said first instructions comprise a time limit for the display of said text on said display.

15. The device of claim 13 wherein said first instructions comprise coordinates for use in the display of said text by said compiled application on said display.

16. The device of claim 13 wherein said text changes in response to input received from said user interface.

17. The device of claim 10 wherein said first instructions contain text for display by said compiled application on said display.

18. The device of claim 10 wherein said first instructions further comprise a second uniform resource locator (URL) associated with a location for access by a browser in response to input received from said user interface, said browser different from said compiled application.

19. A method for execution on a device including a processor, said device comprising at least a network interface for communicating with a network, an operating system, a memory storage, a display, a platform for implementing compiled applications on said device, a compiled application and compiled executable code comprising a plurality of behaviors in portions of code for instantiation into objects, said compiled executable code being associated on the platform with said compiled application and stored in said memory storage, the method comprising:
   executing the compiled application on the platform by said operating system;
   receiving, by said compiled application from said network interface first instructions and second instructions that are not comprised of compiled code, the compiled application having access to the platform to implement application components separately from the first instructions and second instructions and the compiled executable code;
   instantiating by said compiled application, triggered upon said receipt of the first instructions, at least one of said portions of code into a first object for execution by said compiled application;
   instantiating by said compiled application, triggered upon said receipt of the second instructions, at least one of said portions of code into a second object for execution by said compiled application, the second object comprising at least one different said portions of code from the first object; and
   wherein more than one compiled application is executable on the platform by said operating system and on platforms of a different type than said platform, and capable of using the access to the platform of a different type to implement application components separately and using the first and second instructions for instantiating and executing portions of code; and
   wherein said first instructions comprise a uniform resource locator (URL) associated with an image for display on the display, and with respect to the second instructions, said instantiating of the portions of code comprises instantiating an application component object for display.

20. The method of claim 19 further comprising: receiving said second instructions, after a period of time specified in said device, said second instructions different from said first instructions.

21. The method of claim 19 further comprising: receiving said second instructions, after a period of time specified in said first instructions, said second instructions different from said first instructions.

22. The method of claim 19 wherein said device further comprises:
   a user interface for receiving user input;
   a display;
   wherein a portion of said first instructions are not for display on said display.

23. The method of claim 22 further comprising:
   retrieving an image from a URL in said first instructions;
   displaying said image on said display; and
   changing the displayed location of said image on said display based on input received from said user interface.

24. The method of claim 22 further comprising:
   retrieving a text file from a URL in said first instructions;
   displaying said text file on said display; and
   changing the displayed location of said text file on said display based on input received from said user interface.

25. The method of claim 22 wherein said first instructions comprise a first and a second uniform resource locator (URL) wherein said first URL is associated with an image for display on said display and said second URL is associated with a location for access by a browser in response to input received from said user interface; said browser different from said compiled application.

26. The method of claim 19 further comprising: reclaiming by said processor memory from said instantiation of at least one of said portions of code into said objects.

27. A system comprising:
   a processor;
   a network interface for communicating with a network;
   an operating system;
   a memory storage for the storing of first instructions and second instructions that are not comprised of compiled code for subsequent transmission to a compiled application executing on a mobile device having a display and having a platform for implementing compiled applications on said mobile device;
   compiled executable code comprising a plurality of behaviors in portions of code for instantiation into objects, the compiled executable code being associated on the platform with the compiled application and stored in memory storage on the mobile device, the compiled application having access to the platform to implement application components separately from the first instructions and second instructions and the compiled executable code;
   wherein the first instructions upon receipt by said compiled application trigger a first instantiation of at least one of said portions of code into a first object for execution by said compiled application, the second instructions upon receipt by said compiled application trigger a second instantiation of at least one of said portions of code into a second object for execution by said compiled application, the second object comprising at least one different said portions of code from the first object;
   wherein more than one compiled application is executable on the platform by said operating system and on platforms of a different type than said platform, and capable of using the access to the platform of a different type to implement application components separately and using the first and second instructions for triggering and executing portions of code; and
   wherein said first instructions comprise a uniform resource locator (URL) associated with an image for display on the display, and with respect to the second instructions, said triggering of the portions of code comprises instantiating an application component object for display.

28. The system of claim 27 wherein said processor is for responding to requests from said mobile device to send said first instructions and second instructions.

29. The system of claim 27 wherein said network interface is for receiving said second instructions, said second instructions assembled in a compiled program, said second instructions for storage and for subsequent transmission to said mobile device, and said second instructions different from said first instructions.

30. A device including a processor, said device comprising:
   a network interface for communicating with a network;
   an operating system;
   a memory storage;
   a display;
   a platform for implementing compiled applications on said device;
   a compiled application that is executable as a background thread on the device independent from other applications on the platform by said operating system, the compiled application being capable of receiving first instructions and second instructions from the network interface;
   compiled executable code comprising a plurality of behaviors in portions of code for instantiation into objects, the compiled executable code being associated on the platform with the compiled application and stored in the memory storage;
   wherein the compiled application has access to the platform to implement application components separately from the first instructions and second instructions and the compiled executable code, and the compiled application receives first instructions and second instructions from the network interface that are not comprised of compiled code;
   wherein the first instructions upon receipt by said compiled application trigger a first instantiation of at least one of said portions of code into a first object for execution by said compiled application, the second instructions upon receipt by said compiled application trigger a second instantiation of at least one of said portions of code into a second object for execution by said compiled application, the second object comprising at least one different said portions of code from the first object;
   wherein more than one compiled application is executable on the platform by said operating system and on platforms of a different type than said platform, and capable of using the access to a platform of a different type to implement application components separately and using the first and second instructions for triggering and executing portions of code; and
   wherein said first instructions comprise a uniform resource locator (URL) associated with an image for display on the display, and with respect to the second instructions, said triggering of the portions of code comprises instantiating an application component object for display.

* * * * *